United States Patent
Endo et al.

(10) Patent No.: US 9,105,924 B2
(45) Date of Patent: Aug. 11, 2015

(54) POSITIVE ACTIVE MATERIAL FOR LITHIUM SECONDARY BATTERY, PRECURSOR OF POSITIVE ACTIVE MATERIAL, ELECTRODE FOR LITHIUM SECONDARY BATTERY AND LITHIUM SECONDARY BATTERY

(71) Applicant: GS YUASA INTERNATIONAL LTD., Kyoto-shi, Kyoto (JP)

(72) Inventors: Daisuke Endo, Kyoto (JP); Hiromasa Muramatsu, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 19 days.

(21) Appl. No.: 13/914,907

(22) Filed: Jun. 11, 2013

(65) Prior Publication Data

US 2013/0344387 A1    Dec. 26, 2013

(30) Foreign Application Priority Data

Jun. 20, 2012   (JP) ................................. 2012-138419
Jun. 20, 2012   (JP) ................................. 2012-138638
Mar. 14, 2013   (JP) ................................. 2013-051267

(51) Int. Cl.

| | | |
|---|---|---|
| *H01M 4/505* | (2010.01) | |
| *H01M 4/48* | (2010.01) | |
| *H01M 4/525* | (2010.01) | |
| *C01G 53/00* | (2006.01) | |
| *H01M 10/052* | (2010.01) | |

(52) U.S. Cl.
CPC ................. *H01M 4/48* (2013.01); *C01G 53/50* (2013.01); *H01M 4/505* (2013.01); *H01M 4/525* (2013.01); *C01P 2002/76* (2013.01); *C01P 2004/51* (2013.01); *C01P 2004/61* (2013.01); *C01P 2006/40* (2013.01); *H01M 10/052* (2013.01); *H01M 2220/20* (2013.01); *Y02E 60/122* (2013.01); *Y02T 10/7011* (2013.01)

(58) Field of Classification Search
CPC ... H01M 4/505; H01M 4/525; H01M 10/052; H01M 2220/20; H01M 4/48
USPC ........................................ 429/223; 252/182.1
See application file for complete search history.

(56) References Cited

U.S. PATENT DOCUMENTS

| | | | |
|---|---|---|---|
| 2005/0106462 A1* | 5/2005 | Jordy et al. ................. | 429/231.1 |
| 2010/0227220 A1* | 9/2010 | Thackeray et al. ........... | 429/221 |
| 2014/0106212 A1* | 4/2014 | Choi et al. ................... | 429/185 |

FOREIGN PATENT DOCUMENTS

| | | |
|---|---|---|
| EP | 1587156 | 10/2005 |
| EP | 2683004 | 1/2014 |
| EP | 2692693 | 2/2014 |
| JP | 2007-123255 | 5/2007 |
| WO | 2011/108106 | 9/2011 |
| WO | 2011/161755 | 12/2011 |
| WO | 2012/039413 | 3/2012 |
| WO | 2012/091015 | 7/2012 |

OTHER PUBLICATIONS

Extended European Search Report dated Oct. 4, 2013 filed in corresponding European Patent Application No. 13171641.7.
Extended European Search Report dated Aug. 27, 2014 issued in the European patent application No. 14171188.7.

* cited by examiner

*Primary Examiner* — Cynthia H Kelly
*Assistant Examiner* — Monique Wills
(74) *Attorney, Agent, or Firm* — Rankin, Hill & Clark LLP

(57) ABSTRACT

Provided is a positive active material for a lithium secondary battery includes a lithium transition metal composite oxide having an $\alpha$-$NaFeO_2$-type crystal structure and represented by the composition formula of $Li_{1+\alpha}Me_{1-\alpha}O_2$ (Me is a transition metal including Co, Ni and Mn and $\alpha$>0). The positive active material contains Na in an amount of 900 ppm or more and 16000 ppm or less, or K in an amount of 1200 ppm or more and 18000 ppm or less.

5 Claims, No Drawings

POSITIVE ACTIVE MATERIAL FOR LITHIUM SECONDARY BATTERY, PRECURSOR OF POSITIVE ACTIVE MATERIAL, ELECTRODE FOR LITHIUM SECONDARY BATTERY AND LITHIUM SECONDARY BATTERY

CROSS-REFERENCE TO RELATED APPLICATIONS

This application is based on Japanese Application No. 2012-138419 filed with the Japan Patent Office on Jun. 20, 2012, Japanese Application No. 2012-138638 filed with the Japan Patent Office on Jun. 20, 2012 and Japanese Application No. 2013-051267 filed with the Japan Patent Office on Mar. 14, 2013, the entire contents of which are hereby incorporated by reference.

FIELD

The present invention relates to a positive active material for a lithium secondary battery, a precursor of the positive active material, an electrode for a lithium secondary battery which contains the positive active material, and a lithium secondary battery including the electrode.

BACKGROUND

Currently, nonaqueous electrolyte secondary batteries represented by lithium ion secondary batteries, particularly lithium secondary batteries, are widely mounted on portable terminals, and so on. For these nonaqueous electrolyte secondary batteries, principally $LiCoO_2$ is used as a positive active material. However, the discharge capacity of $LiCoO_2$ is about 120 to 130 mAh/g.

As a material of a positive active material for a lithium secondary battery, a solid solution of $LiCoO_2$ and other compounds are known. $Li[Co_{1-2x}Ni_xMn_x]O_2$ ($0<x\leq\frac{1}{2}$), a solid solution having an $\alpha$-$NaFeO_2$-type crystal structure and formed of three components: $LiCoO_2$, $LiNiO_2$ and $LiMnO_2$, was published in 2001. $LiNi_{1/2}Mn_{1/2}O_2$ or $LiCo_{1/3}Ni_{1/3}Mn_{1/3}O_2$ that is one example of the aforementioned solid solution has a discharge capacity of 150 to 180 mAh/g, and is also excellent in terms of charge-discharge cycle performance.

In contrast with so called a "$LiMeO_2$-type" active material as described above, so called a "lithium-excess-type" active material is known in which the composition ratio Li/Me of lithium (Li) to the ratio of a transition metal (Me) is greater than 1, with Li/Me being, for example, 1.25 to 1.6 (see, for example, U.S. Pat. Nos. 6,677,082, 7,135,252, JP-A-10-106543 and JP-A-2010-86690). This material can be denoted as $Li_{1+\alpha}Me_{1-\alpha}O_2$ ($\alpha>0$). Here, $\beta=(1+\alpha)/(1-\alpha)$ when the composition ratio Li/Me of lithium (Li) to the ratio of a transition metal (Me) is $\beta$, and therefore, for example, $\alpha=0.2$ when Li/Me is 1.5.

U.S. Pat. Nos. 6,677,082 and 7,135,252 describe an active material for a lithium secondary battery, which has a general formula of $xLiMO_2\cdot(1-x)Li_2M'O_3$ ($0<x<1$). The documents also describe that M is at least one selected from Mn, Co and Ni and that M' is Mn. The documents show that the active material enriched in Li has a stabilized crystal structure, and a lithium secondary battery having a high discharge capacity is obtained by using this active material.

JP-A-10-106543 describes "a lithium battery comprising a positive active material which is formed of a composite oxide having a composition represented by $Li_xMe_yA_{(1-y)}O_{(1+x)}$ (where $1.3\leq X\leq 2.5$, $0.5\leq Y\leq 0.999$) where Me is at least one transition metal selected from 7A and 8A groups of the periodic table, Mt is a transition metal different from Me, and A is at least one element selected from the group consisting of Mt, Na, K, Rb, Cs, Al, Ga, In, Tl, B, Mg, Ca, Sr, Ba and Pb, and having a hexagonal crystal structure" (claim 1). The document shows that the positive active material enriched in Li has a stabilized crystal structure, and a lithium battery having a high energy density is obtained by using this positive active material. The document also shows as Example a positive active material wherein x is 1.3, Me is Mn and A is Co.

JP-A-2010-86690 describes the invention of "an active material for a lithium secondary battery comprising a solid solution of a lithium transition metal composite oxide having an $\alpha$-$NaFeO_2$-type crystal structure, wherein the composition ratio of Li, Co, Ni and Mn contained in the solid solution satisfies $Li_{1+1/3x}Co_{1-x-y}Ni_{y/2}Mn_{2x/3+y/2}$ ($x+y\leq 1$, $0\leq y$, $1-x-y=z$), (x, y, z) is represented by a value present on the line of or within a heptagon ABCDEFG having point A (0.45, 0.55, 0), point B (0.63, 0.37, 0), point C (0.7, 0.25, 0.05), point D (0.67, 0.18, 0.15), point E (0.75, 0, 0.25), point F (0.55, 0, 0.45) and point G (0.45, 0.2, 0.35) as apexes, in a $Li[Li_{1/3}Mn_{2/3}]O_2(x)$-$LiNi_{1/2}Mn_{1/2}O_2(y)$-$LiCoO_2(z)$-system triangular phase diagram, and the intensity ratio of the diffraction peak of the (003) line and the (104) line in X-ray diffraction measurement is $I_{(003)}/I_{(104)}\geq 1.56$ before charge-discharge, and $I_{(003)}/I_{(104)}>1$ at the end of discharge" (claim 1). The document shows that by using the active material enriched in Li, a lithium secondary battery, which has a high discharge capacity, and particularly has a high discharge capacity in a potential range of 4.3 V or less, is obtained.

On the other hand, it is also known that a positive active material for a lithium secondary battery, which contains a lithium transition metal composite oxide formed of Li and transition metal elements (Co, Ni, Mn and the like) contains an alkali component (see JP-A-2011-124086, JP-A-2009-140787 and International Publication No. WO 2012/039413).

JP-A-2011-124086 describes the invention of "a positive active material for a lithium secondary battery which comprises a lithium composite oxide represented by the following formula (I): $Li_{(x)}Ni_{(1-a-b)}Co_{(a)}Mn_{(b)}O_2$ (1) (where x is $0.98\leq x\leq 1.20$, a is $0<a\leq 0.5$, and b is $0<b\leq 0.5$), wherein the amount of residual alkali present on the surface part of a primary particle is 4000 ppm or less, and the amount of sulfate radicals present on the surface part of the primary particle is 500 to 11000 ppm" (claim 1), and "a positive active material for a lithium secondary battery which is obtained by a first sintering step of sintering at 950° C. or lower a sintering raw material mixture containing a lithium compound, a nickel compound, a cobalt compound and a manganese compound to obtain a lithium composite oxide represented by the following formula (I): $Li_{(x)}Ni_{(1-a-b)}Co_{(a)}Mn_{(b)}O_2$ (1) (where x is $0.98\leq x\leq 1.20$, a is $0<a\leq 0.5$, and b is $0<b\leq 0.5$); an aqueous sulfate solution treatment step comprising washing and contacting with an aqueous sulfate solution the lithium composite oxide obtained in the first sintering step and represented by the general formula (1), so that an aqueous sulfate solution treatment product is obtained; and a second sintering step comprising sintering the aqueous sulfate solution treatment product at 400 to 800° C. to obtain a positive active material for a lithium secondary battery" (claim 4). An object of the invention is to "provide a lithium nickel cobalt manganese-based composite oxide which has a reduced amount of residual alkali present on the surface part of a primary particle and is excellent in cycle performance" (paragraph [0011]).

JP-A-2011-124086 describes that "for the amount of residual alkali present on the surface part of a primary particle of a positive active material, 5 g of a sample and 100 g of ultrapure water were weighed and taken in a beaker, and dispersed at 25° C. for 5 minutes using a magnetic stirrer; then, the dispersion was filtered, 30 ml of the filtrate was titrated with 0.1 N-HCl by an automatic titrator (model: COMTITE-2500), and the amount of residual alkali present in the sample (value obtained by measuring the amount of lithium and calculating it into the amount of lithium carbonate) was calculated." (paragraph [0103]).

JP-A-2009-140787 describes the invention of "a positive active material used in a nonaqueous electrolyte secondary battery, wherein the positive active material is a lithium-nickel-cobalt-manganese composite oxide, and the lithium-nickel-cobalt-manganese composite oxide contains tungsten and niobium" (claim 1) and "the positive active material according to any one of claims 1 to 3, wherein the content of the water-soluble alkali contained in the lithium-nickel-cobalt-manganese composite oxide is 0.2 wt % or less" (claim 4). An object of the invention is to "provide a positive active material which has an excellent power characteristic and generates a reduced amount of gas, and a battery using the positive active material" (paragraph [0009]).

JP-A-2009-140787 also describes that "50 ml of pure water is added to 10 g of a positive active material, and the resulting mixture is stirred for an hour, and then filtered; the filtrate is diluted to an appropriate concentration, followed by adding phenolphthalein as an indicator, and carrying out titration with a $H_2SO_4$ solution; the weight ratio of lithium hydroxide to the positive active material from the result of titration on the presumption that the alkali neutralized with the $H_2SO_4$ solution is all lithium hydroxide; and this value is defined as a content of water-soluble alkali" (paragraph [0056]).

International Publication No. WO 2012/039413 describes the invention of "an active material for a lithium secondary battery, comprising a solid solution of a sodium-containing lithium transition metal composite oxide having an α-NaFeO$_2$-type crystal structure, wherein the chemical composition formula of the solid solution satisfies $Li_{1+x-y}Na_yCo_aNi_bMn_cO_{2+d}$ (0<y≤0.1, 0.4≤c≤0.7, x+a+b+c=1, 0.1≤x≤0.25, −0.2≤d≤0.2), the active material has an X-ray diffraction pattern attributable to a hexagonal crystal (space group P3$_1$12), and in the Miller index hkl, the half width of the diffraction peak of the (003) is 0.30° or less and the half width of the diffraction peak of the (114) line is 0.50° or less" (claim 1). The document shows that according to the invention, "an active material for a lithium secondary battery, which has a high initial efficiency and a high discharge capacity, and particularly has a high discharge capacity at a low temperature, can be provided" (paragraph [0038]). Also, it is shown as Example that the content of Na (value of y described above) is set at 0.01 to 0.1 mol (see Table 1) by a method using a coprecipitation hydroxide precursor.

The discharge capacity of so called a "lithium-excess-type" active material as described above is generally higher than that of so called a "LiMeO$_2$-type" active material. In recent years, however, an active material with a further high discharge capacity has been required for lithium secondary batteries that are used in the field of automobiles such as electric cars, hybrid cars and plug-in hybrid cars.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention has been devised in view of the above-mentioned problem, and one object thereof is to provide a positive active material for a lithium secondary battery, which has a high discharge capacity, and particularly has a high discharge capacity even when such a charge method that the maximum potential of the positive electrode during charge is lower than 4.5 V (vs. Li/Li$^+$), for example 4.3 V (vs. Li/Li$^+$) or less is employed, and a lithium secondary battery using the positive active material.

An aspect of the present invention includes a positive active material for a lithium secondary battery, which includes a lithium transition metal composite oxide having an α-NaFeO$_2$-type crystal structure and represented by the composition formula of $Li_{1+\alpha}Me_{1-\alpha}O_2$ (Me is a transition metal including Co, Ni and Mn and α>0). The positive active material contains Na in an amount of 900 ppm or more and 16000 ppm or less, or K in an amount of 1200 ppm or more and 18000 ppm or less.

DESCRIPTION OF EMBODIMENTS

A positive active material for a lithium secondary battery according to an aspect of the present invention includes a lithium transition metal composite oxide having an α-NaFeO$_2$-type crystal structure and represented by the composition formula of $Li_{1+\alpha}Me_{1-\alpha}O_2$ (Me is a transition metal including Co, Ni and Mn and α>0). The positive active material contains Na in an amount of 900 ppm or more and 16000 ppm or less, or K in an amount of 1200 ppm or more and 18000 ppm or less.

Another aspect of this positive active material for a lithium secondary battery has a 50% particle size (D50) of 8 to 10 μm in particle size distribution measurement.

In another aspect of this positive active material for a lithium secondary battery has a molar ratio of Li to Me, which is represented by (1+α)/(1−α), is 1.25 to 1.45.

A carbonate precursor of a positive active material for a lithium secondary battery according to the present invention contains Na in an amount of 900 ppm or more and 2100 ppm or less and has a 50% particle size (D50) of 8 to 10 μm in particle size distribution measurement. The carbonate precursor is represented by MeCO$_3$ (Me is a transition metal including Co, Ni and Mn).

A method for production of the positive active material for a lithium secondary battery according to the present invention includes adding a sodium compound together with a lithium compound to a carbonate precursor containing Na and represented by MeCO$_3$ (Me is a transition metal including Co, Ni and Mn) in a sintering step. The positive active material contains Na in an amount of 3000 ppm or more and 16000 ppm or less.

A method for production of the positive active material for a lithium secondary battery according to the present invention includes adding a potassium compound together with a lithium compound to a carbonate precursor containing K and represented by MeCO$_3$ (Me is a transition metal including Co, Ni and Mn) in a sintering step. The positive active material contains K in an amount of 1200 ppm or more and 18000 ppm or less.

An electrode for a lithium secondary battery according to the present invention includes the positive active material for a lithium secondary battery described above.

Additionally, a lithium secondary battery according to the present invention includes the electrode for a lithium secondary battery described above.

According to the aspects of the present invention, a lithium secondary battery, which includes a positive active material containing a novel lithium transition metal composite oxide and which has a high discharge capacity, can be provided.

The composition of a lithium transition metal composite oxide contained in an active material for a lithium secondary battery according to the present invention can be denoted as $Li_{1+\alpha}Me_{1-\alpha}O_2$ ($\alpha$>0) which contains a transition metal element Me including Co, Ni and Mn as well as Li. The lithium transition metal composite oxide is so called a "lithium-excess type" which has a high discharge capacity.

The ratio of elements such as Co, Ni and Mn which form a transition metal element that forms the lithium transition metal composite oxide can be arbitrarily selected according to required characteristics.

In the present invention, the molar ratio of Li to the transition metal element Me (Li/Me), which is represented by $(1+\alpha)/(1-\alpha)$ in the composition formula of $Li_{1+\alpha}Me_{1-\alpha}O_2$, is preferably 1.2 to 1.6 because a lithium secondary battery having a high discharge capacity can be obtained. Above all, a composition in which the ratio of Li/Me is 1.25 to 1.45 is more preferably selected to obtain a lithium secondary battery which has a particularly high discharge capacity and is excellent in high rate discharge characteristics.

The molar ratio of Co to the transition metal element Me (Co/Me) is preferably 0.02 to 0.23, more preferably 0.04 to 0.21, most preferably 0.06 to 0.17, to obtain a lithium secondary battery which has a high discharge capacity and is excellent in initial charge-discharge efficiency.

The molar ratio of Mn to the transition metal element Me (Mn/Me) is preferably 0.63 to 0.72, more preferably 0.65 to 0.71, to obtain a lithium secondary battery which has a high discharge capacity and is excellent in initial charge-discharge efficiency.

In the present invention, the lithium transition metal composite oxide represented by the composition formula of $Li_{1+\alpha}Me_{1-\alpha}O_2$ (Me is a transition metal including Co, Ni and Mn and $\alpha$>0) contains Na in an amount of 900 ppm or more and 16000 ppm or less. Improvement of the discharge capacity is not sufficient if the content of Na is less than 900 ppm, while the discharge capacity starts to decrease, paste stability is deteriorated, and processability in preparation of the electrode is deteriorated if the content of Na is more than 16000 ppm. Therefore, for improving the discharge capacity, the content of Na is set to be 900 ppm or more and 16000 ppm or less. The content of Na is preferably 1000 ppm or more and 14000 ppm or less, more preferably 1500 ppm or more and 12000 ppm or less, especially preferably 3000 ppm or more and 10000 ppm or less.

For adjusting the content of Na to the range described above, a method in which in a step of preparing a hydroxide precursor as described later, a sodium compound such as sodium hydroxide is used as a neutralizer, so that Na remains in a washing step, and/or a method in which in a subsequent sintering step, a sodium compound such as sodium carbonate is added can be employed.

In the present invention, the carbonate precursor of the positive active material for a lithium secondary battery is represented by $MeCO_3$ (Me is a transition metal including Co, Ni and Mn), and contains Na in an amount of 900 ppm or more and 2100 ppm or less.

Residual Na in the neutralization/washing step during preparation of the precursor may act as a primary particle growth suppressing agent in a step of sintering so called a "lithium-excess-type" lithium transition metal composite oxide. The electrode characteristic of a lithium secondary battery including the lithium transition metal composite oxide as a positive active material may be improved.

For adjusting the content of Na to a range of 3000 ppm or more and 16000 ppm or less, a method is employed in which Na is made to remain in a washing step as described above, and a sodium compound such as sodium carbonate is added in a subsequent sintering step.

In another aspect of the present invention, the lithium transition metal composite oxide represented by the composition formula of $Li_{1+\alpha}Me_{1-\alpha}O_2$ (Me is a transition metal including Co, Ni and Mn and $\alpha$>0) contains K in an amount of 1200 ppm or more and 18000 ppm or less. Improvement of the discharge capacity is not sufficient if the content of K is less than 1200 ppm, while the discharge capacity starts to decrease if the content of K is more than 18000 ppm. Therefore, for improving the discharge capacity, the content of K is set to be 1200 ppm or more and 18000 ppm or less. The content of K is preferably 1500 ppm or more and 15000 ppm or less, more preferably 2000 ppm or more and 15000 ppm or less, especially preferably 4000 ppm or more and 10000 ppm or less.

For adjusting the content of K to the range described above, a potassium compound such as potassium carbonate is used as a neutralizer in a step of preparing a carbonate precursor as described later, so that K remains in a washing step, and a potassium compound such as potassium carbonate is added in a subsequent sintering step. Since with only potassium carbonate that is used as a neutralizer, the content of K does not reach 1200 ppm or more when washing is performed, it is preferred to add potassium carbonate in the sintering step.

The lithium transition metal composite oxide of the present invention is represented by the general formula described above, is a composite oxide essentially composed of Li, Co, Ni and Mn, and contains a small amount of Na or K, but inclusion of a small amount of other metals, such as alkali metals other than Na or K, alkali earth metals such as Mg and Ca and transition metals represented by 3d transition metals such as Fe and Zn within the bounds of not impairing the effect of the present invention, is not excluded.

The lithium transition metal composite oxide according to the present invention has an $\alpha$-$NaFeO_2$ structure. The lithium transition metal composite oxide after synthesis (before charge-discharge is performed) is attributed to the space group $P3_112$ or R3-m. Among them, in those attributed to the space group $P3_112$, a superlattice peak (peak found in a $(Li[Li_{1/3}Mn_{2/3}]O_2$-type monoclinic crystal) is observed at around $2\theta=21°$ on an X-ray diffraction pattern using a CuK$\alpha$ bulb. However, when charge is carried out at least once, so that Li in the crystal is deintercalated, the symmetry of the crystal is changed, and consequently the superlattice peak disappears, and the lithium transition metal composite oxide is attributed to the space group R3-m. Here, $P3_112$ is a crystal structure model in which atom positions at 3a, 3b and 6c sites in R3-m are subdivided, and the $P3_112$ model is employed when there is orderliness in atom arrangement in R3-m. Properly speaking, "R3-m" should be written with a bar "-" added above "3" of "R3 m".

The lithium transition metal composite oxide according to the present invention is attributed to the space group $P3_112$ or R3-m of the hexagonal crystal, and preferably the half width of the diffraction peak at $2\theta=18.6°\pm1°$ is 0.20° to 0.27° or/and the half width of the diffraction peak at $2\theta=44.1°\pm1°$ is 0.26° to 0.39° on an X-ray diffraction pattern using a CuK$\alpha$ bulb. In this way, the discharge capacity of the positive active material can be increased. The diffraction peak at $2\theta=18.6°\pm1°$ is indexed to the (003) line in the mirror index hkl for space groups $P3_112$ and R3-m, and the diffraction peak at $2\theta=44.1°\pm1°$ is indexed to the (114) line for the space group $P3_112$ and to the (104) line for the space group R3-m, respectively.

In another aspect of the present invention, the positive active material for a lithium secondary battery and the carbonate precursor thereof have a 50% particle size (D50) of 8 to 10 μm or less in particle size distribution measurement. When the lithium transition metal composite oxide is prepared from a hydroxide precursor, excellent performance is not achieved unless the particle size is controlled to be smaller. By preparing the lithium transition metal composite oxide from a carbonate precursor, an active material having a discharge capacity (0.1 C capa) of 200 mAh/g or more is obtained even when the 50% particle size (D50) in particle size distribution measurement is 8 to 10 μm or less.

An active material prepared by way of a carbonate precursor has a peak differential pore volume of 0.85 mm³/(g·nm) or more in a pore region of 30 to 50 nm, whereas an active material prepared by way of a hydroxide precursor has a peak differential pore volume of only about 0.50 mm³/(g·nm) in a pore region of 30 to 50 nm, and the differential peak is in a pore region of about 60 nm.

In the lithium transition metal composite oxide according to another aspect of the present invention, the pore size, at which the differential pore volume determined by a BJH method from an adsorption isotherm obtained using a nitrogen gas adsorption method shows a maximum value, is in a range of 30 to 40 nm, and the peak differential pore volume is 0.85 mm³/(g·nm) or more. Since the peak differential pore volume is 0.85 mm³/(g·nm) or more, a lithium secondary battery excellent in initial efficiency can be obtained. When the peak differential pore volume is 1.76 mm³/(g·nm) or less, a lithium secondary battery, which is not only excellent in initial efficiency but also particularly excellent in discharge capacity, can be obtained, and therefore the peak differential pore volume is preferably 0.85 to 1.76 mm³/(g·nm).

Next, a method for producing the active material for a lithium secondary battery according to the present invention will be described.

The active material for a lithium secondary battery according to the present invention can be obtained essentially by preparing a raw material containing metal elements (Li, Mn, Co and Ni), which form the active material, in accordance with a desired composition of the active material (oxide), and sintering the prepared raw material. For the amount of the Li raw material, however, it is preferable to incorporate the Li raw material in an excessive amount by about 1 to 5% in consideration of elimination of a part thereof during sintering.

For preparing an oxide having a desired composition, so called a "solid state method" in which salts of Li, Co, Ni and Mn are mixed and sintered, and so called a "coprecipitation method" in which a coprecipitation precursor with Co, Ni and Mn existing in one particle is prepared beforehand, and a Li salt is mixed thereto, and the mixture is sintered are known. In the synthesis process of the "solid state method", particularly Mn is hard to be uniformly solid soluted with Co and Ni, and therefore it is difficult to obtain a sample in which the elements are uniformly distributed in one particle. So far, in documents and so on, many attempts have been made to solve Mn with a part of Ni or Co ($LiNi_{1-x}Mn_xO_2$, etc.) by the solid state method, but by selecting the "coprecipitation method", a uniform phase is more easily obtained at an element level. Thus, in Examples described later, the "coprecipitation method" is employed.

When a coprecipitation precursor is prepared, Mn is most easily oxidized among Co, Ni and Mn, so that it is not easy to prepare a coprecipitation precursor in which Co, Ni and Mn are homogeneously distributed in a divalent state, and therefore homogeneous mixing of Co, Ni and Mn at an element level tends to be insufficient. Particularly in the composition range in the present invention, the ratio of Mn is high as compared to the ratios of Co and Ni, and therefore it is particularly important to remove dissolved oxygen in an aqueous solution to prevent Mn from oxidation. Examples of the method for removing dissolved oxygen include a method in which a gas containing no oxygen is bubbled. The gas containing no oxygen is not limited, but a nitrogen gas, an argon gas, carbon dioxide ($CO_2$) or the like can be used. Particularly, when a coprecipitation carbonate precursor is prepared as in Example described later, employment of carbon dioxide as a gas containing no oxygen is preferable because an environment is provided in which the carbonate is more easily generated.

pH in the step of producing a precursor by coprecipitating in a solution a compound containing Co, Ni and Mn is not limited, but can be set at 7.5 to 11 when the coprecipitation precursor is prepared as a coprecipitation carbonate precursor. It is preferable to control pH for increasing the tap density. By setting pH at 9.4 or less, it can be ensured that the tap density is 1.25 g/cm³ or more, so that high rate discharge performance can be improved. Further, by setting pH at 8.0 or less, the particle growth rate can be accelerated, so that the stirring duration after completion of dropwise addition of a raw material aqueous solution can be reduced.

The coprecipitation precursor core is preferably a compound with Mn, Ni and Co mixed homogeneously. In the present invention, the coprecipitation precursor is preferably a carbonate for obtaining an active material for a lithium secondary battery, which has a high discharge capacity. A precursor having a higher bulk density can also be prepared by using a crystallization reaction using a complexing agent. At this time, by carrying out mixing/sintering with a Li source, an active material having a high density, so that the energy density per electrode area can be increased.

Examples of the raw material of the coprecipitation precursor may include manganese oxide, manganese carbonate, manganese sulfate, manganese nitrate and manganese acetate for the Mn compound, nickel hydroxide, nickel carbonate, nickel sulfate, nickel nitrate and nickel acetate for the Ni compound, and cobalt sulfate, cobalt nitrate and cobalt acetate for the Co compound.

In the present invention, a reaction crystallization method for obtaining a coprecipitation carbonate precursor by adding dropwise a raw material aqueous solution of the coprecipitation precursor into a reaction tank kept alkaline is employed. For producing a coprecipitation carbonate precursor containing Na, a sodium compound such as sodium carbonate is used as a neutralizer, but it is preferred to use sodium carbonate or a mixture of sodium carbonate and lithium carbonate. Na/Li, which is a molar ratio of sodium carbonate to lithium carbonate, is preferably 0.85/1.15 [M] or more for ensuring that Na remains in an amount of 900 ppm or more as shown in Example described later. By setting Na/Li at 0.85/1.15 [M] or more, the possibility can be reduced that Na is excessively removed in a subsequent washing step, so that the content of Na is less than 900 ppm.

For producing a coprecipitation carbonate precursor containing K, a potassium compound such as potassium carbonate is used as a neutralizer. The possibility that K is excessively removed in a subsequent washing step can be reduced by using potassium carbonate rather than a mixture of potassium carbonate and lithium carbonate as shown in Example described later.

The rate of dropwise addition of the raw material aqueous solution significantly influences homogeneity of the element distribution within one particle of the coprecipitation precursor generated. Particularly, Mn is hard to form a homogeneous element distribution with Co and Ni, and therefore requires care. For the preferred dropwise addition rate, it depends on the size of the reaction tank, stirring conditions, pH, the reaction temperature and so on, but is preferably 30 ml/min or less. For increasing the discharge capacity, the dropwise addition rate is more preferably 10 ml/min or less, most preferably 5 ml/min or less.

When a complexing agent is present in the reaction tank, and certain convection conditions are applied, rotation and revolution, in a stirring tank, of particles are promoted by further continuing stirring after completion of dropwise addition of the raw material aqueous solution, and in this process, particles are grown stepwise into a concentric circular sphere while colliding with one another. That is, coprecipitation precursor is formed through reactions in two stages, i.e. a metal complex formation reaction when the raw material aqueous solution is added dropwise into the reaction tank and a precipitate formation reaction that occurs during retention of the metal complex in the reaction tank. Therefore, by appropriately selecting a time during which stirring is further continued after completion of dropwise addition of the raw material aqueous solution, a coprecipitation precursor having a desired particle size can be obtained.

For the preferred time during which stirring is continued after completion of dropwise addition of the raw material aqueous solution, it depends on the size of the reaction tank, stirring conditions, pH, the reaction temperature and so on, but is, for example, preferably 0.5 h or more, more preferably 1 h or more for growing particles as uniform spherical particles. For reducing the possibility that the particle size is so large that the power performance of the battery in the low-SOC region is not sufficient, the time is preferably 15 h or less, more preferably 10 h or less, most preferably 5 h or less.

The preferred stirring duration time for ensuring that D50, i.e. a particle size is 8 to 10 μm, at which the cumulative volume in the particle size distribution of secondary particles of the carbonate precursor and the lithium transition metal composite oxide is 50%, varies depending on controlled pH. For example, the stirring duration time is preferably 5 to 7 h when pH is controlled to 8.3 to 8.9, and the stirring duration time is preferably 3 to 5 h when pH is controlled to 7.5 to 8.0.

When particles of the carbonate precursor are prepared using as a neutralizer a sodium compound such as sodium carbonate, sodium ions attached on particles are washed off in a subsequent washing step, and in the present invention, it is necessary to wash off sodium ions under such conditions that Na remains in an amount of 900 ppm or more. When particles of the carbonate precursor are prepared using as a neutralizer a potassium compound such as potassium carbonate, potassium ions attached on particles are washed off in a subsequent washing step, and in the present invention, it is preferred to wash off potassium ions under such conditions that K remains in an amount of 1000 ppm or more. For example, such conditions that the number of washings with 200 ml of ion-exchange water is 5 can be employed when the prepared carbonate precursor is extracted by suction filtration.

Preferably the carbonate precursor is dried under normal pressure in an air atmosphere at a temperature of 80° C. to lower than 100° C. A larger amount of moisture can be removed in a short time when the carbonate precursor is dried at 100° C. or higher, but an active material showing more excellent electrode characteristics can be formed when the carbonate precursor is dried at 80° C. for a long time. Although the reason for this is not necessarily evident, the carbonate precursor is a porous material having a specific surface area of 50 to 100 $m^2/g$, and therefore has a structure in which moisture is easily adsorbed. Thus, the inventor presumes as follows: When the carbonate precursor is dried at a low temperature to ensure that measurable adsorbed water remains in a pore in the state of the precursor, Molten Li can enter the pore in such a manner as to replace adsorbed water that is removed from the pore in a sintering step of mixing the carbonate precursor with a Li salt and sintering the mixture. Consequently an active material having a more uniform composition is obtained as compared to the case where the carbonate precursor is dried at 100° C. Since a carbonate precursor obtained by performing drying at 100° C. shows is deep brown, while a carbonate precursor obtained by performing drying at 80° C. is fresh-colored, a distinction can be made by the color of the precursor.

Thus, for quantitatively evaluating the above-described difference between the precursors, the color phase of each precursor was measured and compared with JPMA Standard Paint Colors (Edition F, 2011) being compliant with JIS Z 8721 and issued by Japan Paint Manufacturers Association. For measurement of the color phase, Color Leader CR10 manufactured by KONICA MINOLTA, INC was used. According to this measurement method, the value of $dL^*$ that represents a brightness is larger when the sample is more whitish, and is smaller when the sample is more blackish. The value of $da^*$ that represents a color phase is larger when the sample is more reddish, and is smaller when the sample is more greenish (less reddish). The value of $db^*$ that represents a color phase is larger when the sample is more yellowish, and is smaller when the sample is more bluish (less yellowish).

It has become apparent that the color phase of a product by drying at 100° C. (Comparative Example) is within a range in which the standard color F05-40D is attained in a red direction as compared to the standard color F05-20B, and is within a range in which the standard color FN-25 is attained in a white direction as compared to the standard color FN-10. It has been found that above all, a color difference between the above-mentioned color phase and a color phase exhibited by the standard color F05-20B is smallest.

It has become apparent that the color phase of a product by drying at 80° C. (Example) is within a range in which the standard color F19-70F is attained in a white direction as compared to the standard color F19-50F, and is within a range in which the standard color F09-60H is attained in a black direction as compared to the standard color F09-80D. It has been found that above all, a color difference between the above-mentioned color phase and a color phase exhibited by the standard color F19-50F is smallest.

From the above findings, it can be said that preferably the color phase of the carbonate precursor is in the + direction in all of dL, da and db as compared to the standard color F05-20B, and more preferably dL is +5 or more, da is +2 or more, and db is +5 or more.

The active material for a lithium secondary battery according to the present invention can be suitably prepared by mixing the carbonate precursor and a Li compound, followed by heat-treating the mixture. By using, as the Li compound, lithium hydroxide, lithium carbonate, lithium nitrate, lithium acetate or the like, the active material can be suitably produced. For the amount of the Li compound, however, it is preferable to incorporate the Li compound in an excessive amount by about 1 to 5% in consideration of elimination of a part thereof during sintering.

In the present invention, a Na compound is preferably mixed with the carbonate precursor containing Na, together with a Li compound, in the sintering step for ensuring that the content of Na in the lithium transition metal composite oxide is 3000 ppm or more. The Na compound is preferably sodium carbonate. The content of Na in the carbonate precursor is about 900 to 2100 ppm, but the content of Na can be increased to 3000 ppm or more by mixing a Na compound.

In the present invention, a K compound is mixed with the carbonate precursor containing the K, together with a Li compound, in the sintering step for ensuring that the content of K in the lithium transition metal composite oxide is 1200 ppm or more. The K compound is preferably potassium carbonate. The content of K in the carbonate precursor is 1000 ppm or less, but the content of K can be increased to 1200 ppm or more by mixing a K compound.

The sintering temperature influences the reversible capacity of the active material.

If the sintering temperature is too high, there is such a tendency that the obtained active material is collapsed with an oxygen release reaction, and a phase defined as a $Li[Li_{1/3}Mn_{2/3}]O_2$ type of a monoclinic crystal, in addition to a hexagonal crystal as a main phase tends to be observed as a separate phase rather than a solid solution phase. Inclusion of this separate phase in a too large amount is not preferable because the reversible capacity of the active material is reduced. In this material, impurity peaks are observed at around 35° and at around 45° on the X-ray diffraction pattern. Therefore, the sintering temperature is preferably lower than a temperature at which the oxygen release reaction of the active material is influential. Therefore, it is important to ensure that the sintering temperature is lower than a temperature at which the oxygen release reaction of the active material is influential. The oxygen release temperature of the active material is generally 1000° C. or higher in the composition range according to the present invention, but since the oxygen release temperature slightly varies depending on the composition of the active material, it is preferable to check the oxygen release temperature of the active material beforehand. Particularly, it should be noted that the oxygen release temperature has been found to shift toward the low temperature side as the amount of Co contained in the active material increases. As a method for checking the oxygen release temperature of the active material, a mixture of a coprecipitation precursor with Li compound may be subjected to thermogravimetric analysis (DTA-TG measurement) for simulating a sintering reaction process, but in this method, platinum used in a sample chamber of a measuring instrument may be corroded by a volatilized Li component to damage the instrument, and therefore a composition that is crystallized on some level beforehand by employing a sintering temperature of about 500° C. should be subjected to thermogravimetric analysis.

On the other hand, if the sintering temperature is too low, there is such a tendency that crystallization does not sufficiently proceed, and the electrode characteristic is degraded. In the present invention, the sintering temperature is preferably at least 700° C. By ensuring sufficient crystallization, the resistance of a crystal grain boundary can be reduced to facilitate smooth transportation of lithium ions.

Furthermore, the inventors precisely analyzed the half width of the active material of the present invention to find that a strain remained in a lattice in the active material synthesized at a temperature of up to 750° C., and the strain could be mostly removed by synthesizing the active material at a higher temperature. The size of the crystallite was increased proportionally as the synthesis temperature was elevated. Therefore, in the composition of the active material of the present invention, a good discharge capacity was also obtained by aiming for particles in which the strain of the lattice is little present in a lattice, and the crystallite size is sufficiently grown. Specifically, it has been found that it is preferable to employ such a synthesis temperature (sintering temperature) that the amount of strain having an effect on the lattice constant is 2% or less, and the crystallite size is grown to 50 nm or more. When these particles are molded as an electrode and charge-discharge is performed, a change occurs due to expansion and contraction, but it is preferable for effect of present invention that the crystallite size to be kept at 30 nm or more even in a charge-discharge process. That is, an active material having a high reversible capacity can be obtained only by selecting the sintering temperature so as to be as close as possible to the above-described oxygen release temperature of the active material.

As described above, the preferred sintering temperature varies depending on the oxygen release temperature of the active material, and it is therefore difficult to uniformly set a preferred range of the sintering temperature, but for making the discharge capacity sufficiently high when the molar ratio of Li/Me is 1.2 to 1.6, the sintering temperature is preferably 700 to 950° C., and more preferably around 700 to 900° C. particularly when Li/Me is 1.25 to 1.45.

The nonaqueous electrolyte used in the lithium secondary battery according to the present invention is not limited, and those that are generally proposed to be used in lithium batteries and the like can be used. Examples of the nonaqueous solvent used in the nonaqueous electrolyte may include, but are not limited to, cyclic carbonates such as propylene carbonate, ethylene carbonate, butyrene carbonate, chloroethylene carbonate and vinylene carbonate; cyclic esters such as γ-butyrolactone and γ-valerolactone; chain carbonates such as dimethyl carbonate, diethyl carbonate and ethylmethyl carbonate; chain esters such as methyl formate, methyl acetate and methyl butyrate; tetrahydrofuran or derivatives thereof ethers such as 1,3-dioxane, 1,4-dioxane, 1,2-dimethoxyethane, 1,4-dibutoxyethane and methyl diglyme; nitriles such as acetonitrile, benzonitrile; dioxolane or derivatives thereof; and ethylene sulfide, sulfolane, sultone or derivatives thereof alone or mixtures of two or more thereof.

Examples of the electrolyte salt used in the nonaqueous electrolyte include inorganic ion salts having one of lithium (Li), sodium (Na) and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, KSCN, and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_3H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearylsulfonate, lithium octylsulfonate and lithium dodecylbenzenesulfonate, these ionic compounds can be used alone or in combination of two or more thereof.

Further, by mixing $LiBF_4$ with a lithium salt having a perfluoroalkyl group, such as $LiN(C_2F_5SO_2)_2$, the viscosity of the electrolyte can be further reduced, so that the low-temperature characteristic can be further improved, and self discharge can be suppressed, thus being more desirable.

A ambient temperature molten salt or an ion liquid may be used as a nonaqueous electrolyte.

The concentration of the electrolyte salt in the nonaqueous electrolyte is preferably 0.1 mol/l to 5 mol/l, further preferably 0.5 mol/l to 2.5 mol/l for reliably obtaining a nonaqueous electrolyte battery having high battery characteristics.

The negative electrode material is not limited, and may be freely selected as long as it can precipitate or insert lithium ions. Examples thereof include titanium-based materials such as lithium titanate having a spinel-type crystal structure represented by $Li[Li_{1/3}Ti_{5/3}]O_4$, alloy-based materials such as Si-, Sb- and Sn-based alloy materials, lithium metal, lithium alloys (lithium metal-containing alloys such as lithium-silicon, lithium-aluminum, lithium-lead, lithium-tin, lithium-aluminum-tin, lithium-gallium and wood alloys), lithium composite oxides (lithium-titanium) and silicon oxide as well as alloys capable of insertion/extraction lithium, and carbon materials (e.g. graphite, hard carbon, low temperature-calcinated carbon and amorphous carbon).

In the present invention, a powder of a positive active material has a 50% particle size (D50) of 5 µm or less in particle size distribution measurement, but it is desirable that a powder of a negative electrode material have an average particle size of 100 µm or less. A crusher and a classifier are used for obtaining a powder in a predetermined shape. For example, a mortar, a ball mill, a sand mill, a vibration ball mill, a planet ball mill, a jet mill, a counter jet mill, a revolving airflow-type jet mill, a sieve or the like is used. At the time of crushing, wet crushing can also be used in which water, or an organic solvent such as hexane coexists. The classification method is not particularly limited, a sieve, an air classifier or the like is used as necessary in both dry and wet processes.

The positive active material and the negative electrode material which are main components of the positive electrode and the negative electrode have been described in detail above, but the aforementioned positive electrode and negative electrode may contain, in addition to the aforementioned main components, a conducting additive, a binding agent, a thickener, a filler and the like as other components.

The conducting additive is not limited as long as it is an electron-conductive material that has no adverse effect on battery performance, but normally conductive materials such as natural graphite (scaly graphite, flake graphite, earthy graphite, etc.), artificial graphite, carbon black, acetylene black, ketjen black, carbon whisker, carbon fibers, metal (copper, nickel, aluminum, silver, gold, etc.) powders, metal fibers and conductive ceramic materials can be included alone or as a mixture thereof.

Among them, acetylene black is desirable as a conducting additive from the viewpoint of electron conductivity and coating properties. The added amount of the conducting additive is preferably 0.1% by weight to 50% by weight, especially preferably 0.5% by weight to 30% by weight based on the total weight of the positive electrode or negative electrode. Particularly, use of acetylene black crushed into ultrafine particles of 0.1 to 0.5 µm is desirable because the required amount of carbon can be reduced. These mixing methods involve physical mixing, the ideal of which is homogeneous mixing. Thus, mixing can be carried out in a dry process or a wet process using a powder mixer such as a V-type mixer, an S-type mixer, a grinder, a ball mill or a planet ball mill.

As the binding agent, thermoplastic resins such as polytetrafluoroethylene (PTFE), polyvinylidene difluoride (PVDF), polyethylene and polypropylene, and polymers having rubber elasticity, such as ethylene-propylene-diene terpolymer (EPDM), sulfonated EPDM, styrene-butadiene rubber (SBR) and fluororubber can normally be used alone or as a mixture of two or more thereof. The added amount of the binding agent is preferably 1 to 50% by weight, especially preferably 2 to 30% by weight based on the total weight of the positive electrode or negative electrode.

The filler may be any material as long as it has no adverse effect on battery performance. A polyolefin-based polymer such as polypropylene or polyethylene, amorphous silica, alumina, zeolite, glass, carbon or the like is normally used. The added amount of the filler is preferably 30% by weight or less based on the total amount of the positive electrode or the negative electrode.

The positive electrode and the negative electrode are suitably prepared by mixing the aforementioned main components (positive active material in the positive electrode and negative electrode material in the negative electrode) and other materials to form a mixture, and mixing the mixture with an organic solvent such as N-methylpyrrolidone or toluene, followed by applying or contact-bonding the resulting mixed liquid onto a current collector that is described in detail below, and carrying out a heating treatment at a temperature of about 50° C. to 250° C. for about 2 hours. For the aforementioned coating method, for example, it is desirable to perform coating in any thickness and any shape using means such as roller coating by an applicator roll or the like, screen coating, a doctor blade system, spin coating or a bar coater, but the applying method is not limited thereto.

As a separator, it is preferable that a porous membrane, a nonwoven fabric or the like, which shows excellent high-rate discharge performance, be used alone or in combination. Examples of the material that forms the separator for a non-aqueous electrolyte battery include polyolefin-based resins represented by polyethylene, polypropylene and the like, polyester-based resins represented by polyethylene terephthalate, polybutyrene terephthalate and the like, polyvinylidene difluoride, vinylidene fluoride-hexafluoropropylene copolymers, vinylidene fluoride-perfluoro vinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers and vinylidene fluoride-ethylene-tetrafluoroethylene copolymers.

The porosity of the separator is preferably 98% by volume or less from the viewpoint of the strength. The porosity is preferably 20% by volume or more from the viewpoint of charge-discharge characteristics.

For the separator, for example, a polymer gel formed of acrylonitrile, ethylene oxide, propylene oxide, methyl methacrylate, vinyl acetate, vinyl pyrrolidone or a polymer such as polyfluoride vinylidene and an electrolyte may be used. Use of the nonaqueous electrolyte in a gel form as described above is preferable from the viewpoint of being effective to prevent liquid leakage.

Further, for the separator, use of the above-mentioned porous membrane, nonwoven fabric or the like and the polymer gel in combination is desirable because liquid retainability of the electrolyte is improved. That is, a film with the surface and the microporous wall face of a polyethylene microporous membrane coated with a solvophilic polymer in a thickness of several µm or less, and an electrolyte is held within micropores of the film, so that the solvophilic polymer is formed into a gel.

Examples of the solvophilic polymer include, in addition to polyfluoride vinylidene, polymers in which an acrylate monomer having an ethylene oxide group, an ester group or the like, an epoxy monomer, a monomer having an isocyanate group, or the like is crosslinked. The monomer can be subjected to a crosslinking reaction by carrying out heating or using ultraviolet rays (UV) while using a radical initiator at the same time, or using active light rays such as electron beams (EB), or the like.

The configuration of the lithium secondary battery is not particularly limited, and examples thereof include a cylindrical battery, a prismatic battery and a flat battery having a positive electrode, a negative electrode and a roll-shaped separator.

Both the conventional positive active material and the active material of the present invention are capable of charge-discharge at a positive electrode potential of around 4.5 V (vs. Li/Li$^+$). However, depending on the type of a nonaqueous electrolyte used, battery performance may be deterioration by oxidative decomposition of the nonaqueous electrolyte if the positive electrode potential during charge is too high. Therefore, a lithium secondary battery, with which a sufficient discharge capacity is obtained even when such a charge method that the maximum potential of the positive electrode during charge is 4.3 V (vs. Li/Li$^+$) or less is employed at the time of operation, may be required. If the active material of the present invention is used, a discharge electrical amount, which exceeds the capacity of the conventional positive active material, i.e. about 200 mAh/g or more can be obtained even when such a charge method that the maximum potential of the positive electrode during charge is lower than 4.5 V (vs. Li/Li$^+$), for example 4.4 (vs. Li/Li$^+$) or less or 4.3 (vs. Li/Li$^+$) or less is employed at the time of operation For the positive active material according to the present invention to have a high discharge capacity, the ratio, at which transition metal elements that form a lithium transition metal composite oxide are present in areas other than transition metal sites of a layered rock-salt-type crystal structure, is preferably low. This can be achieved by ensuring that in the precursor that is subjected to a sintering step, transition metal elements such as Co, Ni and Mn in the precursor core particles are sufficiently homogeneously distributed, and selecting suitable conditions for the sintering step for promoting crystallization of an active material sample. If distribution of transition metals in precursor core particles that are subjected to the sintering step is not homogeneous, a sufficient discharge capacity is not obtained. The reason for this is not necessarily clear, but the present inventors think that this results from occurrence of so called cation mixing in which the obtained lithium transition metal composite oxide has some of transition metal elements present in areas other than transition metal sites of the layered rock-salt-type crystal structure, i.e. lithium sites, if the distribution of transition metals in precursor core particles that are subjected to the sintering step is not homogeneous. A similar thought can be applied in a crystallization process in the sintering step, wherein cation mixing in the layered rock-salt-type crystal structure easily occurs if crystallization of the active material sample is insufficient. Those in which the homogeneity of the distribution of the transition metal elements is high tend to have a high intensity ratio of diffraction peaks of the (003) line and the (104) line when the result of X-ray diffraction measurement is attributed to a space group R3-m. In the present invention, the intensity ratio of diffraction peaks of the (003) line and the (104) line from X-ray diffraction measurement is preferably $I_{(003)}/I_{(104)} \geq 1.0$. The intensity ratio is preferably $I_{(003)}/I_{(104)} > 1$ at the end of discharge after charge-discharge. If synthesis conditions and synthesis procedures for the precursor are inappropriate, the peak intensity ratio becomes a smaller value, which is often less than 1.

By employing the synthesis conditions and synthesis procedures described in the specification of the present application, a positive active material having high performance as described above can be obtained. Particularly, there can be provided a positive active material for a lithium secondary battery with which a high discharge capacity can be obtained even when the charge upper limit potential is set to lower than 4.5 (vs.Li/Li$^+$), e.g. lower than 4.4 V (vs.Li/Li$^+$) or 4.3 V (vs.Li/Li$^+$).

EXAMPLE 1

EXAMPLE 1-1

Cobalt sulfate heptahydrate (14.08 g), nickel sulfate hexahydrate (21.00 g) and manganese sulfate pentahydrate (65.27 g) were weighed, and totally dissolved in 200 ml of ion-exchange water to prepare a 2.0 M aqueous sulfate solution of which the molar ratio of Co:Ni:Mn was 12.50:19.94:67.56. 750 ml of ion exchange-water was poured into a 2 L reaction tank, and a $CO_2$ gas was bubbled for 30 min to thereby dissolve the $CO_2$ gas in ion-exchange water. The temperature of the reaction tank was set at 50° C. (±2° C.), and the aqueous sulfate solution was added dropwise at a rate of 3 ml/min while the contents in the reaction tank was stirred at a rotation speed of 700 rpm using a paddle impeller equipped with a stirring motor. The control was performed so that pH in the reaction tank was kept at 7.9 (±0.05) by appropriately adding dropwise an aqueous solution containing 1.0 M sodium carbonate, 1.0 M lithium carbonate and 0.4 M ammonia during dropwise addition of the aqueous sulfate solution. After completion of dropwise addition, stirring the contents in the reaction tank was continued for further 3 h. After stirring was stopped, the reaction tank was left standing for 12 h or more.

Next, particles of a coprecipitation carbonate generated in the reaction tank were separated using a suction filtration device. Sodium ions attached on the particles were further washed off under conditions of performing washing five times, with one-time washing including performing washing using 200 ml of ion-exchange water. The particles were dried at 80° C. for 20 h under normal pressure in air atmosphere using an electric furnace. Thereafter, the particles were crushed by an automatic mortar made of agate for equalizing the particle size. In this way, a coprecipitation carbonate precursor was prepared.

Lithium carbonate (0.970 g) was added to the coprecipitation carbonate precursor (2.278 g), and the mixture was adequately mixed using an automatic mortar made of agate to prepare a mixed powder of which the molar ratio of Li:(Co, Ni, Mn) was 130:100. The powder was molded at a pressure of 6 MPa using a pellet molding machine to form a pellet having a diameter of 25 mm. The amount of the mixed powder subjected to pellet molding was determined by performing conversion calculation so that the mass as an expected final product would be 2 g. One of the pellets was placed in an alumina boat having a total length of about 100 mm, the boat was placed in a box-type electric furnace (model: AMF 20), the temperature was elevated from ordinary temperature to 900° C. under normal pressure in an air atmosphere over 10 hours, and the pellet was sintered at 900° C. for 4 h. The box-type electric furnace had an internal dimension of 10 cm (height), 20 cm (width) and 30 cm (depth), and provided with electrically heated wires at intervals of 20 cm in the width direction. After calcination, a heater was switched off, the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken out after confirming that the temperature of the furnace was not higher than 100° C., and crushed by an automatic mortar made of agate for equalizing the particle size. In this way, a lithium transition metal composite oxide $Li_{1.13}Co_{0.11}Ni_{0.17}Mn_{0.59}O_2$ containing Na according to Example 1-1 was prepared.

EXAMPLES 1-2 TO 1-6

Lithium transition metal composite oxides containing Na according to Examples 1-2 to 1-6 were prepared in the same manner as in Example 1-1 except that the molar ratio (molar ratio of Na/Li) of sodium carbonate and lithium carbonate contained in an aqueous solution that was added dropwise when a coprecipitation carbonate precursor was prepared was not 1/1 [M] but changed as described in Examples 1-2 to 1-6 in Table 1.

EXAMPLE 1-7

Cobalt sulfate heptahydrate (14.08 g), nickel sulfate hexahydrate (21.00 g) and manganese sulfate pentahydrate (65.27 g) were weighed, and totally dissolved in 200 ml of ion-exchange water to prepare a 2.0 M aqueous sulfate solution of which the molar ratio of Co:Ni:Mn was 12.50:19.94: 67.56. 750 ml of ion exchange-water was poured into a 2 L reaction tank, and a $CO_2$ gas was bubbled for 30 min to thereby dissolve the $CO_2$ gas in ion-exchange water. The temperature of the reaction tank was set at 50° C. (±2° C.), and the aqueous sulfate solution was added dropwise at a rate of 3 ml/min while the contents in the reaction tank was stirred at a rotation speed of 700 rpm using a paddle impeller equipped with a stirring motor. Here, the control was performed so that pH in the reaction tank was kept at 7.9 (±0.05) by appropriately adding dropwise an aqueous solution containing 2.0 M sodium carbonate and 0.4 M ammonia during dropwise addition of the aqueous sulfate solution. After completion of dropwise addition, stirring the contents in the reaction tank was continued for further 3 h. After stirring was stopped, the reaction tank was left standing for 12 h or more.

Next, particles of a coprecipitation carbonate generated in the reaction tank were separated using a suction filtration device, sodium ions attached on the particles were further washed off under conditions of performing washing five times, with one-time washing including performing washing using 200 ml of ion-exchange water, and the particles were dried at 80° C. for 20 h under normal pressure in air atmosphere using an electric furnace. Thereafter, the particles were crushed by an automatic mortar made of agate for equalizing the particle size. In this way, a coprecipitation carbonate precursor was prepared.

Lithium carbonate (0.970 g) and sodium carbonate (0.005 g) were added to the coprecipitation carbonate precursor (2.278 g), and the mixture was adequately mixed using an automatic mortar made of agate to prepare a mixed powder of which the molar ratio of Li:(Co, Ni, Mn) was 130:100. The powder was molded at a pressure of 6 MPa using a pellet molding machine to form a pellet having a diameter of 25 mm. The amount of the mixed powder subjected to pellet molding was determined by performing conversion calculation so that the mass as an expected final product would be 2 g. One of the pellets was placed in an alumina boat having a total length of about 100 mm, the boat was placed in a box-type electric furnace (model: AMF 20), the temperature was elevated from ordinary temperature to 900° C. under normal pressure in air atmosphere over 10 hours, and the pellet was sintered at 900° C. for 4 h. The box-type electric furnace had an internal dimension of 10 cm (height), 20 cm (width) and 30 cm (depth), and provided with electrically heated wires at intervals of 20 cm in the width direction. After calcination, a heater was switched off, the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken out after confirming that the temperature of the furnace was not higher than 100° C., and crushed by an automatic mortar made of agate for equalizing the particle size. In this way, a lithium transition metal composite oxide $Li_{1.13}Co_{0.11}Ni_{0.17}Mn_{0.59}O_2$ containing Na according to Example 1-7 was prepared.

EXAMPLES 1-8 TO 1-14 and Comparative Example 1-1

Lithium transition metal composite oxides containing Na according to Examples 1-8 to 1-10 and Comparative Example 1-1 were prepared in the same manner as in Example 1-7 except that the amount of sodium carbonate added to the coprecipitation carbonate precursor (2.278 g) together with lithium carbonate (0.970 g) was changed to 0.018 g in Example 1-8, 0.023 g in Example 1-9, 0.046 g in Example 1-10 and 0.069 g in Comparative Example 1-1.

Lithium transition metal composite oxides containing Na according to Examples 1.11 to 1-14 were prepared in the same manner as in Example 1-7 except that to the coprecipitation carbonate precursor (2.278 g) was added lithium carbonate (0.969 g), and the amount of sodium carbonate added therewith was changed to 0.0599 g in Example 1-11, 0.0645 g in Example 1-12, 0.0691 g in Example 1.13 and 0.0737 g in Example 1-14.

EXAMPLES 1-15 TO 1-19

Lithium transition metal composite oxides containing Na according to Examples 1-15 to 1-19 were each prepared in the same manner as in Examples 1.1 to 1-5 except that the sintering temperature was changed from 900° C. to 850° C.

EXAMPLES 1-20 TO 1-24

Lithium transition metal composite oxides containing Na according to Examples 1-20 to 1-24 were each prepared in the same manner as in Examples 1-1 to 1-5 except that the sintering temperature was changed from 900° C. to 800° C.

EXAMPLES 1-25 TO 1-30

Lithium transition metal composite oxides $Li_{1.17}Co_{0.10}Ni_{0.17}Mn_{0.56}O_2$ containing Na according to Examples 1-25 to 1-30 were each prepared in the same manner as in Examples 1-1 to 1-6 except that the molar ratio of Li/Me (Co, Ni, Mn) was changed from 1.3 to 1.4 (coprecipitation carbonate precursor:lithium carbonate=2.228 g:1.021 g).

EXAMPLE 1-31

A lithium transition metal composite oxide containing Na according to Example 1-31 was prepared in the same manner as in Example 1-25 except that the time over which contents in the reaction tank were further continuously stirred after completion of dropwise addition in the step of preparing a coprecipitation carbonate precursor was changed from 3 h to 4 h.

EXAMPLES 1-32 TO 1-39

Lithium transition metal composite oxides $Li_{1.17}Co_{0.10}Ni_{0.17}Mn_{0.56}O_2$ containing Na according to Examples 1-32 to 1-39 were prepared in the same manner as in Example 1-7 except that for changing the molar ratio of Li/Me (Co, Ni, Mn) from 1.3 to 1.4, 1.021 g of lithium carbonate was added to 2.228 g of the coprecipitation carbonate precursor, and the amount of sodium carbonate added therewith was changed to 0.0138 g in Example 1-32, 0.0277 g in Example 1-33, 0.0320 g in Example 1-34, 0.0553 g in Example 1-35, 0.0599 g in Example 1-36, 0.0645 g in Example 1-37, 0.0691 g in Example 1-38 and 0.0737 g in Example 1-39.

EXAMPLES 1-40 TO 1-46

Lithium transition metal composite oxides $Li_{1.11}Co_{0.11}Ni_{0.18}Mn_{0.60}O_2$ containing Na according to Examples 1-40 to 1-46 were prepared in the same manner as in Example 1-7 except that for changing the molar ratio of Li/Me (Co, Ni, Mn) from 1.3 to 1.25, 0.942 g of lithium carbonate was added to 2.304 g of the coprecipitation carbonate precursor, and the amount of sodium carbonate added therewith was changed to 0.0138 g in Example 1-40, 0.0277 g in Example 1-41, 0.0320 g in Example 1-42, 0.0553 g in Example 1-43, 0.0599 g in Example 1-44, 0.0645 g in Example 1-45 and 0.0691 g in Example 1-46.

EXAMPLES 1-47 TO 1-53

Lithium transition metal composite oxides $Li_{1.184}Co_{0.102}Ni_{0.163}Mn_{0.551}O_2$ containing Na according to Examples 1-47 to 1-53 were prepared in the same manner as in Example 1-7 except that for changing the molar ratio of Li/Me (Co, Ni, Mn) from 1.3 to 1.45, 1.046 g of lithium carbonate was added to 2.203 g of the coprecipitation carbonate precursor, and the amount of sodium carbonate added therewith was changed to 0.0138 g in Example 1-47, 0.0277 g in Example 1-48, 0.0320 g in Example 1-49, 0.0553 g in Example 1-50, 0.0599 g in Example 1-51, 0.0645 g in Example 1-52 and 0.0691 g in Example 1-53.

COMPARATIVE EXAMPLES 1-2 TO 1-6

Lithium transition metal composite oxides according to Comparative Examples 1-2 to 1-6 were prepared in the same manner as in Example 1-1 except that the ratio (molar ratio of Na/Li) of sodium carbonate and lithium carbonate contained in an aqueous solution that was added dropwise when a coprecipitation carbonate precursor was prepared was not 1/1 [M] but changed as described in Comparative Examples 1-2 to 1-6 in Table 1 (no sodium carbonate in Comparative Example 1-6).

COMPARATIVE EXAMPLE 1-7

A lithium transition metal composite oxide according to Comparative Example 1-7 was prepared in the same manner as in Example 1-1 except that potassium carbonate was contained, in place of sodium carbonate and lithium carbonate in an aqueous solution that was added dropwise when a coprecipitation carbonate precursor was prepared.

COMPARATIVE EXAMPLE 1-8

A lithium transition metal composite oxide according to Comparative Example 1-8 was prepared in the same manner as in Example 1-1 except that ammonium hydrogen carbonate was contained, in place of sodium carbonate and lithium carbonate in an aqueous solution that was added dropwise when a coprecipitation carbonate precursor was prepared.

COMPARATIVE EXAMPLE 1-9

A lithium transition metal composite oxide according to Comparative Example 1-9 was prepared in the same manner as in Example 1-5 except that the composition was changed from $Li_{1.13}Co_{0.11}Ni_{0.17}Mn_{0.59}O_2$ to $LiCo_{1/3}Ni_{1/3}Mn_{1/3}O_2$.

COMPARATIVE EXAMPLE 1-10

A lithium transition metal composite oxide according to Comparative Example 1-10 was prepared in the same manner as in Comparative Example 1-6 except that the composition was changed from $Li_{1.13}Co_{0.11}Ni_{0.17}Mn_{0.59}O_2$ to $LiCo_{1/3}Ni_{1/3}Mn_{1/3}O_2$.

(Measurement of the Amount of Na Contained in Lithium Transition Metal Composite Oxide)

The amount of Na contained in the obtained lithium transition metal composite oxide was determined in the following manner. An active material (50 mg) was weighed, and put in 10 ml of a 10 wt % aqueous hydrochloric acid solution. By heating the aqueous solution on a hot plate at 150° C., the active material was sufficiently dissolved. Thereafter, the aqueous solution was filtered using a suction filtration device to remove fine particles contained in the aqueous solution. Ion-exchange water (90 ml) was added to the aqueous solution after filtration, and the resulting mixture was stirred to prepare 100 ml of a sample solution. Three reference solutions having known Na concentrations were prepared for creating a calibration curve for determining a Na content. The reference solution was prepared by diluting a Na standard solution (manufactured by Nacalai Tesque, Inc.; 1000 ppm) to a desired concentration using ion-exchange water.

The Na content was measured by performing an analysis with an ICP emission spectrophotometer (SHIMADZU, ICPS-8100) using about 20 to 40 ml of each of the sample solution and the reference solution.

The amount of Na contained in the lithium transition metal composite oxide can be measured by atomic absorption spectroscopy aside from the ICP emission spectroscopic analysis described above.

(Measurement of Particle Size)

For the lithium transition metal composite oxides according to Examples 1-1 to 1-53 and Comparative Examples 1-1 to 1-10, particle size distribution measurements were made in accordance with the following conditions and procedure. Microtrac (model: MT 3000) manufactured by Nikkiso Co., Ltd. was used as a measuring apparatus. The measuring apparatus includes an optical stage, a sample supply section and a computer including control software, and a wet cell having a laser light transmission window is placed on the optical stage. For the measurement principle, a wet cell, through which a dispersion with a measurement object sample dispersed in a dispersive solvent is circulated, is irradiated with laser light, and a distribution of scattered light from the measurement sample is converted into a particle size distribution. The dispersion is stored in a sample supply section, and cyclically supplied to the wet cell by a pump. The sample supply section constantly receives ultrasonic vibrations. In this measurement, water was used as a dispersive solvent. Microtrac DHS for Win 98 (MT 3000) was used as measurement control software. For "substance information" set and input in the measuring apparatus, a value of 1.33 was set as the "refractive index" of the solvent, "Transparent" was selected as the "transparency", and "Nonspherical" was selected as the "spherical particle". A "Set Zero" operation is performed prior to measurement of the sample. The "Set Zero" operation is an operation for subtracting influences on subsequent measurements of disturbance factors (glass, contamination of the glass wall face, glass irregularities, etc.) other than scattered light from particles, wherein only water as a dispersive solvent is fed in a sample supply section, a background operation is performed with only water as a dispersive solvent being circulated through a wet cell, and background data is stored in a computer. Subsequently, a "Sample LD (Sample Loading)" operation is performed. The Sample LD operation is an operation for optimizing the concentration of a sample in a dispersion that is cyclically supplied to a wet cell during measurement, wherein a measurement object sample is manually introduced into a sample supply section in accordance with instructions of measurement control software until an optimum amount is reached. Subsequently, a "measurement" button is depressed, so that a measurement operation is performed. The measurement operation is repeated twice and as an average thereof, a measurement result is output from a computer. The measurement result is acquired as a particle size distribution histogram, and the values of D10, D50 and D90 (D10, D50 and D90 are particle sizes at which the cumulative volume in the particle size distribution of secondary particles is 10%, 50% and 90%, respectively. Values of D50 measured are shown in Table 1 as "D50 particle size (μm)".

The cumulative volume in the particle size distribution of secondary particles of the carbonate precursor was comparable to that of the lithium transition metal composite oxide.
(Pore Volume Distribution Measurement)

For the lithium transition metal composite oxides according to Examples 1-5, 1-24 and 1-29, pore volume distribution measurements were made in accordance with the following conditions and procedure. For measurement of the pore volume distribution, "Autosorb iQ" and control/analysis software "ASiQwin" manufactured by Quantachrome Instruments were used. A lithium transition metal composite oxide (1.00 g) as a sample to be measured was placed in a sample tube for measurement, and vacuum-dried at 120° C. for 12 h to sufficiently remove moisture in the measurement sample. Next, by a nitrogen gas adsorption method using liquid nitrogen, isotherms on the adsorption side and the desorption side were measured at a relative pressure P/P0 (P0=about 770 mmHg) ranging from 0 to 1. Then, a pore distribution was evaluated by performing a calculation by BJH method using the isotherm on the desorption side.

In the lithium transition metal composite oxides according to Examples 1-5, 1-24 and 1-29, the pore sizes, at which the differential pore volume determined by BJH method from an adsorption isotherm obtained using a nitrogen gas adsorption method shows a maximum value, were in a range of 30 to 40 nm, and the peak differential pore volumes were 1.39 mm$^3$/(g·nm), 1.76 mm$^3$/(g·nm) and 0.85 mm$^3$/(g·nm), respectively.
(Assembling and Evaluation of Lithium Secondary Battery)

A lithium secondary battery was assembled by the following procedure using the lithium transition metal composite oxide of each of Examples 1-1 to 1-53 and Comparative Examples 1-1 to 1-10 as a positive active material for a lithium secondary battery, and battery characteristics were evaluated.

A applying paste was prepared in which the active material, acetylene black (AB) and polyvinylidene fluoride (PVdF) were mixed at a ratio of 90:5:5 in terms of a weight ratio and dispersed with N-methylpyrrolidone as a dispersion medium. The applying paste was applied to one surface of an aluminum foil current collector having a thickness of 20 μm to prepare a positive electrode plate. The mass and coating thickness of the active material coated per fixed area were equalized so that test conditions were the same among the lithium secondary batteries of all Examples and Comparative Examples.

For the purpose of accurately observing the independent behavior of a positive electrode, metallic lithium was brought into close contact with a nickel foil current collector and used for a counter electrode, i.e. a negative electrode. Here, a sufficient amount of metallic lithium was placed on the negative electrode so that the capacity of the lithium secondary battery was not limited by the negative electrode.

As an electrolyte solution, a solution obtained by dissolving LiPF$_6$, in a concentration of 1 mol/l, in a mixed solvent of ethylene carbonate (EC)/ethylmethyl carbonate (EMC)/dimethyl carbonate (DMC) in a volume ratio of 6:7:7, was used. As a separator, a microporous membrane made of polypropylene, the surface of which was modified with polyacrylate, was used. As a sheath, a metal resin composite film made of polyethylene terephthalate (15 μm)/aluminum foil (50 μm)/metal-adhesive polypropylene film (50 μm) was used. The electrode was stored such that the open ends of a positive electrode terminal and a negative electrode terminal were externally exposed. Fusion margins with the inner surfaces of the aforementioned metal resin composite films facing each other were airtightly sealed except a portion forming an electrolyte solution filling hole. The electrolyte solution was injected, followed by sealing the electrolyte solution filling hole.

The lithium secondary battery assembled in the procedure described above was subjected to an initial charge-discharge step at 25° C. Charge was constant current-constant voltage charge with a current of 0.1 CA and a voltage of 4.6 V, and the charge termination condition was set at a time point at which the current value decreased to ⅙. Discharge was constant current discharge with a current of 0.1 CA and a final voltage of 2.0 V. This charge-discharge was carried out 2 cycles. Here, a rest step of 30 minutes was provided each after charge and after discharge.

Next, a 1 cycle charge-discharge test was conducted with the charge voltage changed. Voltage control was all performed for the positive electrode potential. Conditions for the charge-discharge test are the same as the conditions for the initial charge-discharge step except that the charge voltage is 4.3 V. The discharge capacity at this time was recorded as a "discharge capacity (mAh/g)" (described as "0.1 C capa" in the table).

The test results for the lithium secondary battery using the lithium transition metal composite oxide according to each of Examples 1-1 to 1-53 and Comparative Examples 1-1 to 1-10 as a positive active material for a lithium secondary battery are shown in Tables 1 and 2.

TABLE 1

|  | Neutralizer | Li/Me molar ratio | Sintering temperature (° C.) | Na (ppm) | D50 particle size (μm) | 0.1 C capa (mAh/g) |
|---|---|---|---|---|---|---|
| Example 1-1 | Na/Li = 1/1[M] | 1.3 | 900 | 1000 | 8 | 215 |
| Example 1-2 | Na/Li = 1.3/0.7[M] | ↑ | ↑ | 1200 | 8 | 220 |

TABLE 1-continued

|  | Neutralizer | Li/Me molar ratio | Sintering temperature (° C.) | Na (ppm) | D50 particle size (μm) | 0.1 C capa (mAh/g) |
|---|---|---|---|---|---|---|
| Example 1-3 | Na/Li = 1.6/0.4[M] | ↑ | ↑ | 1500 | 8 | 224 |
| Example 1-4 | Na/Li = 1.9/0.1[M] | ↑ | ↑ | 1800 | 8 | 228 |
| Example 1-5 | $Na_2CO_3$ 2[M] | ↑ | ↑ | 2100 | 8 | 226 |
| Example 1-6 | Na/Li = 0.85/1.15[M] | ↑ | ↑ | 900 | 8 | 197 |
| Example 1-7 | $Na_2CO_3$ 2[M] + Na added | ↑ | ↑ | 3000 | 8 | 230 |
| Example 1-8 | ↑ | ↑ | ↑ | 6000 | 8 | 236 |
| Example 1-9 | ↑ | ↑ | ↑ | 7000 | 8 | 234 |
| Example 1-10 | ↑ | ↑ | ↑ | 12000 | 8 | 226 |
| Example 1-11 | ↑ | ↑ | ↑ | 13000 | 8 | 221 |
| Example 1-12 | ↑ | ↑ | ↑ | 14000 | 8 | 211 |
| Example 1-13 | ↑ | ↑ | ↑ | 15000 | 8 | 193 |
| Example 1-14 | ↑ | ↑ | ↑ | 16000 | 8 | 185 |
| Comparative Example 1-1 | ↑ | ↑ | ↑ | 17000 | 8 | 178 |
| Example 1-15 | Na/Li = 1/1[M] | ↑ | 850 | 1000 | 8 | 213 |
| Example 1-16 | Na/Li = 1.3/0.7[M] | ↑ | ↑ | 1200 | 8 | 219 |
| Example 1-17 | Na/Li = 1.6/0.4[M] | ↑ | ↑ | 1500 | 8 | 223 |
| Example 1-18 | Na/Li = 1.9/0.1[M] | ↑ | ↑ | 1800 | 8 | 225 |
| Example 1-19 | $Na_2CO_3$ 2[M] | ↑ | ↑ | 2100 | 8 | 225 |
| Example 1-20 | Na/Li = 1/1[M] | ↑ | 800 | 1000 | 8 | 208 |
| Example 1-21 | Na/Li = 1.3/0.7[M] | ↑ | ↑ | 1200 | 8 | 210 |
| Example 1-22 | Na/Li = 1.6/0.4[M] | ↑ | ↑ | 1500 | 8 | 210 |
| Example 1-23 | Na/Li = 1.9/0.1[M] | ↑ | ↑ | 1800 | 8 | 212 |
| Example 1-24 | $Na_2CO_3$ 2[M] | ↑ | ↑ | 2100 | 8 | 213 |
| Example 1-25 | Na/Li = 1/1[M] | 1.4 | 900 | 1000 | 8 | 212 |
| Example 1-26 | Na/Li = 1.3/0.7[M] | ↑ | ↑ | 1200 | 8 | 215 |
| Example 1-27 | Na/Li = 1.6/0.4[M] | ↑ | ↑ | 1500 | 8 | 218 |
| Example 1-28 | Na/Li = 1.9/0.1[M] | ↑ | ↑ | 1800 | 8 | 220 |
| Example 1-29 | $Na_2CO_3$ 2[M] | ↑ | ↑ | 2100 | 8 | 220 |
| Example 1-30 | Na/Li = 0.85/1.15[M] | ↑ | ↑ | 900 | 8 | 195 |
| Example 1-31 | Na/Li = 1/1[M] | ↑ | ↑ | 1000 | 10 | 214 |

TABLE 2

|  | Neutralizer | Li/Me molar ratio | Sintering temperature (° C.) | Na (ppm) | D50 particle size (μm) | 0.1 C capa (mAh/g) |
|---|---|---|---|---|---|---|
| Example 1-32 | $Na_2CO_3$ 2[M] + Na added | 1.4 | 900 | 3000 | 8 | 222 |
| Example 1-33 | ↑ | ↑ | ↑ | 6000 | 8 | 224 |
| Example 1-34 | ↑ | ↑ | ↑ | 7000 | 8 | 224 |
| Example 1-35 | ↑ | ↑ | ↑ | 12000 | 8 | 222 |
| Example 1-36 | ↑ | ↑ | ↑ | 13000 | 8 | 220 |
| Example 1-37 | ↑ | ↑ | ↑ | 14000 | 8 | 220 |
| Example 1-38 | ↑ | ↑ | ↑ | 15000 | 8 | 212 |
| Example 1-39 | ↑ | ↑ | ↑ | 16000 | 8 | 203 |
| Example 1-40 | ↑ | 1.25 | ↑ | 3000 | 8 | 210 |
| Example 1-41 | ↑ | ↑ | ↑ | 6000 | 8 | 213 |
| Example 1-42 | ↑ | ↑ | ↑ | 7000 | 8 | 213 |
| Example 1-43 | ↑ | ↑ | ↑ | 12000 | 8 | 211 |
| Example 1-44 | ↑ | ↑ | ↑ | 13000 | 8 | 210 |
| Example 1-45 | ↑ | ↑ | ↑ | 14000 | 8 | 205 |
| Example 1-46 | ↑ | ↑ | ↑ | 15000 | 8 | 201 |
| Example 1-47 | ↑ | 1.45 | ↑ | 3000 | 8 | 209 |
| Example 1-48 | ↑ | ↑ | ↑ | 6000 | 8 | 212 |
| Example 1-49 | ↑ | ↑ | ↑ | 7000 | 8 | 213 |
| Example 1-50 | ↑ | ↑ | ↑ | 12000 | 8 | 213 |
| Example 1-51 | ↑ | ↑ | ↑ | 13000 | 8 | 214 |
| Example 1-52 | ↑ | ↑ | ↑ | 14000 | 8 | 214 |
| Example 1-53 | ↑ | ↑ | ↑ | 15000 | 8 | 212 |
| Comparative Example 1-2 | Na/Li = 0.7/1.3[M] | 1.4 | 900 | 800 | 8 | 179 |
| Comparative Example 1-3 | Na/Li = 0.5/1.5[M] | ↑ | ↑ | 600 | 8 | 175 |
| Comparative Example 1-4 | Na/Li = 0.3/1.7[M] | ↑ | ↑ | 400 | 8 | 168 |
| Comparative Example 1-5 | Na/Li = 0.1/1.9[M] | ↑ | ↑ | 200 | 8 | 163 |
| Comparative Example 1-6 | $Li_2CO_3$ 2[M] | ↑ | ↑ | 100 | 8 | 162 |

TABLE 2-continued

|  | Neutralizer | Li/Me molar ratio | Sintering temperature (°C) | Na (ppm) | D50 particle size (μm) | 0.1 C capa (mAh/g) |
|---|---|---|---|---|---|---|
| Comparative Example 1-7 | K₂CO₃ 2[M] | ↑ | ↑ | 100 | 8 | 170 |
| Comparative Example 1-8 | NH₄HCO₃ 2[M] | ↑ | ↑ | 100 | 8 | 156 |
| Comparative Example 1-9 | Na₂CO₃ 2[M] | 1.0 | 900 | 2100 | 8 | 153 |
| Comparative Example 1-10 | Li₂CO₃ 2[M] | 1.0 | ↑ | 100 | 8 | 155 |

It is apparent from Tables 1 and 2 that lithium secondary batteries using the positive active materials of Examples 1-1 to 1-53, in which the Li/Me ratio of the lithium transition metal composite oxide is 1.25 to 1.45, Na is contained in an amount of 900 to 16000 ppm, and the D50 particle size is 8 to 10 μm, have a high discharge capacity with the discharge capacity (0.1 C capa) being 180 mAh/g or more, and particularly those containing Na in an amount of 1000 to 14000 ppm have a discharge capacity (0.1 C capa) of 200 mAh/g or more.

On the other hand, lithium secondary batteries using the positive active materials in which the Li/Me ratio is 1.25 to 1.45, but the content of Na is less than 900 ppm for Comparative Examples 1-2 to 1-8 and the content of Na is more than 16000 ppm for Comparative Example 1-1 have a discharge capacity (0.1 C capa) of less than 180 mAh/g, and improvement of the discharge capacity is not sufficient.

The lithium secondary battery using a positive active material (LiCo$_{1/3}$Ni$_{1/3}$Mn$_{1/3}$O$_2$), which is not of so called a "lithium-excess-type" but of so called a "LiMeO$_2$-type", has a discharge capacity (0.1 C capa) of only 153 mAh/g, although the content of Na is 2100 ppm, as shown in Comparative Example 1-9. Moreover, since the lithium secondary battery of Comparative Example 1-9 described above has a discharge capacity comparable to that of the lithium secondary battery of Comparative Example 1-10 using a positive active material of the same "LiMeO$_2$-type" in which the content of Na is 100 ppm, such an effect that the discharge capacity is significantly improved by including Na in a specified amount may be specific to the "lithium-excess-type" positive active material.

EXAMPLE 2

EXAMPLE 2-1

Cobalt sulfate heptahydrate (14.08 g), nickel sulfate hexahydrate (21.00 g) and manganese sulfate pentahydrate (65.27 g) were weighed, and totally dissolved in 200 ml of ion-exchange water to prepare a 2.0 M aqueous sulfate solution of which the molar ratio of Co:Ni:Mn was 12.50:19.94:67.56. 750 ml of ion exchange-water was poured into a 2 L reaction tank, and a CO$_2$ gas was bubbled for 30 min to thereby dissolve the CO$_2$ gas in ion-exchange water. The temperature of the reaction tank was set at 50° C. (±2° C.), and the aqueous sulfate solution was added dropwise at a rate of 3 ml/min while the contents in the reaction tank was stirred at a rotation speed of 700 rpm using a paddle impeller equipped with a stirring motor. Here, the control was performed so that pH in the reaction tank was kept at 7.9 (±0.05) by appropriately adding dropwise an aqueous solution containing 2.0 M potassium carbonate and 0.4 M ammonia during dropwise addition of the aqueous sulfate solution. After completion of dropwise addition, stirring the contents in the reaction tank was continued for further 3 h. After stirring was stopped, the reaction tank was left standing for 12 h or more.

Next, particles of a coprecipitation carbonate generated in the reaction tank were separated using a suction filtration device. Potassium ions attached on the particles were further washed off under conditions of performing washing five times, with one-time washing including performing washing using 200 ml of ion-exchange water. The particles were dried at 80° C. for 20 h under normal pressure in air atmosphere using an electric furnace. Thereafter, the particles were crushed by an automatic mortar made of agate for equalizing the particle size. In this way, a coprecipitation carbonate precursor was prepared.

Lithium carbonate (0.970 g) and potassium carbonate (0.004 g) were added to the coprecipitation carbonate precursor (2.278 g), and the mixture was adequately mixed using an automatic mortar made of agate to prepare a mixed powder of which the molar ratio of Li=(Co, Ni, Mn) was 130:100. The powder was molded at a pressure of 6 MPa using a pellet molding machine to form a pellet having a diameter of 25 mm. The amount of the mixed powder subjected to pellet molding was determined by performing conversion calculation so that the mass as an expected final product would be 2 g. One of the pellets was placed in an alumina boat having a total length of about 100 mm, the boat was placed in a box-type electric furnace (model: AMF 20), the temperature was elevated from ordinary temperature to 900° C. under normal pressure in an air atmosphere over 10 hours, and the pellet was sintered at 900° C. for 4 h. The box-type electric furnace had an internal dimension of 10 cm (height), 20 cm (width) and 30 cm (depth), and provided with electrically heated wires at intervals of 20 cm in the width direction. After calcination, a heater was switched off, and the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken out after confirming that the temperature of the furnace was not higher than 100° C., and crushed by an automatic mortar made of agate for equalizing the particle size. In this way, a lithium transition metal composite oxide Li$_{1.13}$Co$_{0.11}$Ni$_{0.17}$Mn$_{0.59}$O$_2$ containing K according to Example 2-1 was prepared.

EXAMPLES 2-2 TO 2-10

Lithium transition metal composite oxides containing K according to Examples 2-2 to 2-8 were prepared in the same manner as in Example 2q except that the amount of potassium carbonate added to the coprecipitation carbonate precursor (2.278 g) together with lithium carbonate (0.970 g) was changed to 0.011 g in Example 2-2, 0.018 g in Example 2-3, 0.032 g in Example 2-4, 0.050 g in Example 2-5, 0.054 g in Example 2-6, 0.057 g in Example 2-7 and 0.060 g in Example 2-8.

Lithium transition metal composite oxides containing K according to Examples 2-9 and 2-10 were prepared in the same manner as in Example 2-1 except that to the coprecipitation carbonate precursor (2.278 g) was added lithium carbonate (0.969 g), and the amount of potassium carbonate added therewith was changed to 0.0043 g in Example 2-9 and 0.0053 g in Example 2-10.

EXAMPLES 2-11 TO 2-17

Lithium transition metal composite oxides containing K according to Examples 2-11 to 2-17 were each prepared in the same manner as in Examples 2-1 to 2-7 except that the sintering temperature was changed from 900° C. to 800° C.

EXAMPLES 2-18 TO 2-27

Lithium transition metal composite oxides $Li_{1.17}Co_{0.10}Ni_{0.17}Mn_{0.56}O_2$ containing K according to Examples 2-18 to 2-27 were each prepared in the same manner as in Examples 2-1 to 2-10 except that the molar ratio of Li/Me (Co, Ni, Mn) was changed from 1.3 to 1.4 (coprecipitation carbonate precursor:lithium carbonate=2.228 g:1.021 g).

EXAMPLES 2-28 TO 2-32

Lithium transition metal composite oxides $Li_{1.11}Co_{0.11}Ni_{0.18}Mn_{0.60}O_2$ containing K according to Examples 2.28 to 2-32 were each prepared in the same manner as in Examples 2-1 to 2-5 except that for changing the molar ratio of Li/Me (Co, Ni, Mn) from 1.3 to 1.25, lithium carbonate (0.942 g) was added to the coprecipitation carbonate precursor (2.304 g), and the amount of potassium carbonate added therewith was changed to 0.0071 g in Example 2-28, 0.0142 g in Example 2-29, 0.0213 g in Example 2-30, 0.0354 g in Example 2-31 and 0.0532 g in Example 2-32.

EXAMPLES 2-33 TO 2-37

Lithium transition metal composite oxides $Li_{1.184}Co_{0.102}Ni_{0.163}Mn_{0.551}O_2$ containing K according to Examples 2-33 to 2-37 were prepared in the same manner as in Examples 2-1 to 2-5 except that for changing the molar ratio of Li/Me (Co, Ni, Mn) from 1.3 to 1.45, lithium carbonate (1.046 g) was added to the coprecipitation carbonate precursor (2.203 g), and the amount of potassium carbonate added therewith was changed to 0.0071 g in Example 2-33, 0.0142 g in Example 2-34, 0.0213 g in Example 2-35, 0.0354 g in Example 2-36 and 0.0532 g in Example 2-37.

COMPARATIVE EXAMPLES 2-1 AND 2-2

Lithium transition metal composite oxides containing K according to Comparative Examples 2-1 and 2-2 were prepared in the same manner as in Example 2-1 except that the amount of potassium carbonate added to 2.278 g of the coprecipitation carbonate precursor together with 0.970 g of lithium carbonate was changed to 0.064 g in Comparative Example 2-1 and 0.067 g in Comparative Example 2-2.

COMPARATIVE EXAMPLES 2-3 AND 2-4

Lithium transition metal composite oxides containing K according to Comparative Examples 2-3 and 2-4 were each prepared in the same manner as in Comparative Examples 2-1 and 2-2 except that the sintering temperature was changed from 900° C. to 800° C.

COMPARATIVE EXAMPLES 2-5 AND 2-6

Lithium transition metal composite oxides containing K according to Comparative Examples 2-5 and 2-6 were prepared in the same manner as in Example 2-18 except that the amount of potassium carbonate added to 2.228 g of the coprecipitation carbonate precursor together with 1.021 g of lithium carbonate was changed to 0.064 g in Comparative Example 2.5 and 0.067 g in Comparative Example 2-6.

COMPARATIVE EXAMPLE 2-7

A lithium transition metal composite oxide containing K according to Comparative Example 2-7 was prepared in the same manner as in Example 2-1 except that potassium carbonate was not added but only 0.970 g of lithium carbonate was added to 2.278 g of the coprecipitation carbonate precursor.

COMPARATIVE EXAMPLES 2-8 TO 2-10

Lithium transition metal composite oxides according to Comparative Examples 2-8 to 2-10 were prepared in the same manner as in Example 2-1 except a change was made such that in an aqueous solution that was added dropwise when a precipitation carbonate precursor was prepared, potassium carbonate and lithium carbonate were contained in place of 2.0 M potassium carbonate (K/Li=1/1 [M] in Comparative Example 2-8; K/Li=0.5/1.5 [M] in Comparative Example 2-9), and potassium carbonate was not contained but 2.0 M lithium carbonate was contained (Comparative Example 2-10).

COMPARATIVE EXAMPLE 2-11

A lithium transition metal composite oxide according to Comparative Examples 2-11 was prepared in the same manner as in Example 2-1 except that ammonium hydrogen carbonate was contained, in place of potassium carbonate, in an aqueous solution that was added dropwise when a coprecipitation carbonate precursor was prepared.

COMPARATIVE EXAMPLE 2-12

A lithium transition metal composite oxide containing K according to Comparative Example 2-12 was prepared in the same manner as in Example 2-1 except that the composition was changed from $Li_{1.13}Co_{0.11}Ni_{0.17}Mn_{0.59}O_2$ to $LiCo_{1/3}Ni_{1/3}Mn_{1/3}O_2$.

COMPARATIVE EXAMPLE 2-13

A lithium transition metal composite oxide according to Comparative Example 2-13 was prepared in the same manner as in Comparative Example 2-10 except that the composition was changed from $Li_{1.13}Co_{0.11}Ni_{0.17}Mn_{0.59}O_2$ to $LiCo_{1/3}Ni_{1/3}Mn_{1/3}O_2$.

(Measurement of the Amount of K Contained in Lithium Transition Metal Composite Oxide)

The amount of K contained in the obtained lithium transition metal composite oxide was determined by performing an analysis with an ICP emission spectrophotometer (SHIMADZU, ICPS-8100) as in the measurement of the amount of Na.

(Measurement of Particle Size)

For the lithium transition metal composite oxides according to Examples 2-1 to 2-37 and Comparative Examples 2-1 to 2-13, particle size distribution measurements were made in the same manner as in the measurement for the lithium transition metal composite oxide according to Example 1. Values of D50 measured were all 8 μm.

(Assembling and Evaluation of Lithium Secondary Battery)

A lithium secondary battery was assembled in the same manner as in Example 1 using the lithium transition metal composite oxide of each of Examples 2-1 to 2-37 and Comparative Examples 2-1 to 2-13 as a positive active material for a lithium secondary battery, and battery characteristics were evaluated.

The test results for the lithium secondary battery using the lithium transition metal composite oxide according to each of Examples 2-1 to 2-37 and Comparative Examples 2-1 to 2-13 as a positive active material for a lithium secondary battery are shown in Tables 3 and 4.

TABLE 3

| | Neutralizer (+additive) | Li/Me (molar ratio) | Sintering temperature (° C.) | K (ppm) | 0.1 C capa (mAh/g) |
|---|---|---|---|---|---|
| Example 2-1 | K$_2$CO$_3$ 2[M] (+K$_2$ CO$_3$) | 1.3 | 900 | 2000 | 221 |
| Example 2-2 | ↑ | ↑ | ↑ | 4000 | 236 |
| Example 2-3 | ↑ | ↑ | ↑ | 6000 | 231 |
| Example 2-4 | ↑ | ↑ | ↑ | 10000 | 224 |
| Example 2-5 | ↑ | ↑ | ↑ | 15000 | 200 |
| Example 2-6 | ↑ | ↑ | ↑ | 16000 | 193 |
| Example 2-7 | ↑ | ↑ | ↑ | 17000 | 188 |
| Example 2-8 | ↑ | ↑ | ↑ | 18000 | 180 |
| Example 2-9 | ↑ | ↑ | ↑ | 1200 | 203 |
| Example 2-10 | ↑ | ↑ | ↑ | 1500 | 208 |
| Example 2-11 | ↑ | ↑ | 800 | 2000 | 212 |
| Example 2-12 | ↑ | ↑ | ↑ | 4000 | 216 |
| Example 2-13 | ↑ | ↑ | ↑ | 6000 | 218 |
| Example 2-14 | ↑ | ↑ | ↑ | 10000 | 215 |
| Example 2-15 | ↑ | ↑ | ↑ | 15000 | 210 |
| Example 2-16 | ↑ | ↑ | ↑ | 16000 | 195 |
| Example 2-17 | ↑ | ↑ | ↑ | 17000 | 186 |
| Example 2-18 | ↑ | 1.4 | 900 | 2000 | 213 |
| Example 2-19 | ↑ | ↑ | ↑ | 4000 | 215 |
| Example 2-20 | ↑ | ↑ | ↑ | 6000 | 217 |
| Example 2-21 | ↑ | ↑ | ↑ | 10000 | 214 |
| Example 2-22 | ↑ | ↑ | ↑ | 15000 | 211 |
| Example 2-23 | ↑ | ↑ | ↑ | 16000 | 200 |
| Example 2-24 | ↑ | ↑ | ↑ | 17000 | 191 |
| Example 2-25 | ↑ | ↑ | ↑ | 18000 | 183 |
| Example 2-26 | ↑ | ↑ | ↑ | 1200 | 191 |
| Example 2-27 | ↑ | ↑ | ↑ | 1500 | 202 |
| Example 2-28 | ↑ | 1.25 | ↑ | 2000 | 215 |
| Example 2-29 | ↑ | ↑ | ↑ | 4000 | 218 |
| Example 2-30 | ↑ | ↑ | ↑ | 6000 | 218 |
| Example 2-31 | ↑ | ↑ | ↑ | 10000 | 216 |
| Example 2-32 | ↑ | ↑ | ↑ | 15000 | 205 |
| Example 2-33 | ↑ | 1.45 | ↑ | 2000 | 201 |
| Example 2-34 | ↑ | ↑ | ↑ | 4000 | 204 |
| Example 2-35 | ↑ | ↑ | ↑ | 6000 | 210 |
| Example 2-36 | ↑ | ↑ | ↑ | 10000 | 207 |
| Example 2-37 | ↑ | ↑ | ↑ | 15000 | 205 |

TABLE 4

| | Neutralizer (+additive) | Li/Me (molar ratio) | Sintering temperature (° C.) | K (ppm) | 0.1 C capa (mAh/g) |
|---|---|---|---|---|---|
| Comparative Example 2-1 | K$_2$CO$_3$ 2[M] (+K$_2$ CO$_3$) | 1.3 | 900 | 19000 | 175 |
| Comparative Example 2-2 | ↑ | ↑ | ↑ | 20000 | 170 |
| Comparative Example 2-3 | ↑ | ↑ | 800 | 19000 | 171 |
| Comparative Example 2-4 | ↑ | ↑ | ↑ | 20000 | 165 |
| Comparative Example 2-5 | ↑ | 1.4 | 900 | 19000 | 179 |
| Comparative Example 2-6 | ↑ | ↑ | ↑ | 20000 | 173 |

TABLE 4-continued

|  | Neutralizer (+additive) | Li/Me (molar ratio) | Sintering temperature (° C.) | K (ppm) | 0.1 C capa (mAh/g) |
|---|---|---|---|---|---|
| Comparative Example 2-7 | K$_2$CO$_3$ 2[M] | 1.3 | 900 | 1000 | 165 |
| Comparative Example 2-8 | K/Li = 1/1[M] | ↑ | ↑ | 600 | 163 |
| Comparative Example 2-9 | K/Li = 0.5/1.5[M] | ↑ | ↑ | 300 | 165 |
| Comparative Example 2-10 | Li$_2$CO$_3$ 2[M] | ↑ | ↑ | 100 | 162 |
| Comparative Example 2-11 | NH$_4$HCO$_3$ 2[M] | ↑ | ↑ | 100 | 156 |
| Comparative Example 2-12 | K$_2$CO$_3$ 2[M] (+ K$_2$ CO$_3$) | 1.0 | 900 | 2000 | 152 |
| Comparative Example 2-13 | Li$_2$CO$_3$ 2[M] | 1.0 | ↑ | 100 | 155 |

It is apparent from Table 3 that lithium secondary batteries using the positive active materials of Examples 2-1 to 2-37, in which the Li/Me ratio of the lithium transition metal composite oxide is 1.25 to 1.45 and K is contained in an amount of 1200 to 18000 ppm, have a high discharge capacity with the discharge capacity (0.1 C capa) being 180 mAh/g or more, and particularly those containing K in an amount of 1500 to 15000 ppm have a discharge capacity (0.1 C capa) of 200 mAh/g or more.

On the other hand, from Table 4, lithium secondary batteries using the positive active materials in which the Li/Me ratio is 1.25 to 1.45, but the content of K is less than 1200 ppm for Comparative Examples 2-7 to 2-11 and the content of K is more than 18000 ppm for Comparative Examples 2-1 to 2-6 have a discharge capacity (0.1 C capa) of less than 180 mAh/g, and improvement of the discharge capacity is not sufficient.

The lithium secondary battery using a positive active material (LiCo$_{1/3}$Ni$_{1/3}$Mn$_{1/3}$O$_2$), which is not of so called a "lithium-excess-type" but of so called a "LiMeO$_2$-type", has a discharge capacity (0.1 C capa) of only 152 mAh/g, although the content of K is 1200 ppm or more, as shown in Comparative Example 2-12. Moreover, since the lithium secondary battery of Comparative Example 2-12 described above has a discharge capacity comparable to that of the lithium secondary battery of Comparative Example 2-13 using a positive active material of the same "LiMeO$_2$-type" in which the content of K is 100 ppm, such an effect that the discharge capacity is significantly improved by including K in a specified amount may be specific to the "lithium-excess-type" positive active material.

In Examples described above, the content of Na, the content of K and the value of D50 (D50 particle size) in the particle size distribution of secondary particles for the lithium transition metal composite oxide of the present invention have been described on the basis of the results of making measurements for the lithium transition metal composite oxide (positive active material) before preparation of the electrode. However, for a lithium secondary battery having history of charge-discharge, the content of Na, the content of K and the value of the D50 particle size can be determined by carrying out a treatment in accordance with the procedure described below.

First, a lithium secondary battery having a history of charge-discharge (in the present invention, a lithium secondary battery of which "discharge capacity (mAh/g)" was measured in Example) is sufficiently discharged by low rate discharge at about 0.1 CmA, and the lithium secondary battery is disassembled in an atmosphere with a dew point of −20° C. or lower to take out a positive electrode. The positive electrode that is taken out is placed in a thermostatic bath at 80° C., and dried until an electrolyte solution (solvent) attached thereon is sufficiently volatilized. From the positive electrode, a composite (55 mg) is taken from a composite layer containing a positive active material, and an ICP emission spectroscopic analysis is performed according to the procedure described in Example using the obtained composite. The obtained value is converted into a concentration per mass of the positive active material.

Using the method described above, the battery was disassembled and the amount of Na contained in the positive electrode was measured after charge-discharge for the positive active material of Example 1-5. As a result, it was found that the content of Na after synthesis of the positive active material (before the battery was assembled) was 2100 ppm, while the content of Na after charge-discharge (after the battery was disassembled) was 2000 ppm, and thus Na was contained in the positive electrode in an amount almost equal to the amount of Na contained in the active material before the battery was assembled.

Using the method described above, the battery was disassembled and the amount of K contained in the positive electrode was measured after charge-discharge for the positive active material of Example 2-1. As a result, it was found that the content of K after synthesis of the positive active material (before the battery was assembled) was 2000 ppm, while the content of K after charge-discharge (after the battery was disassembled) was also 2000 ppm, and thus K was contained in the positive electrode in an amount almost equal to the amount of K contained in the active material before the battery was assembled.

In a positive electrode using the positive active material of Example, a significant change was not observed in the contents of Na and K even after charge-discharge. Therefore, it can be said that according to the measurement method described above, the content of Na and/or K in the positive active material can be measured even for a lithium secondary battery after charge-discharge.

In a lithium secondary battery using a positive electrode containing the positive active material of the present invention, Na and/or K in the positive active material may leak out from the positive electrode depending on use conditions. In this case, Na and/or K is also contained in an electrolyte solution and a negative electrode, and therefore by measuring not only the content of Na and/or K in the positive electrode but also measuring the amount of Na and/or K contained in the electrolyte solution and/or the negative electrode, the amount of Na and/or K contained in the positive active material can be known more accurately.

By performing a treatment in accordance with the procedure described below for a lithium secondary battery having a history of charge-discharge, for which the battery is discharged, the positive electrode is taken out and the positive electrode is dried as described above, the value of the D50 particle size can be determined.

The positive active material is separated from the positive composite of the positive electrode. The positive composite often contains a conducting material and a binder. Examples of the method for removing a binder from the positive composite include a method in which a solvent capable of dissolving the binder is used. For example, when the binder is thought to be polyvinylidene fluoride, mention is made of a method in which the positive composite is immersed in a sufficient amount of N-methylpyrrolidone, heated at 150° C. for several hours, and then separated into a powder containing the positive active material and a solvent containing the binder by filtration or the like. For example when the conducting material is thought to be a carbonaceous material such as acetylene black, examples of the method for removing the conducting material from the powder containing the positive active material, from which the binder is removed in the manner described above, include a method in which the carbonaceous material is oxidatively decomposed to be removed by a heat treatment. Conditions for the heat treatment are required to include a temperature at which the conducting material is thermally decomposed in an atmosphere including oxygen, or higher, but if the heat treatment temperature is too high, the properties of the positive active material may be changed, and therefore such a temperature is desirable that has no influences on the properties of the positive active material wherever possible. For example, in the case of the positive active material of the present invention, this temperature may be about 700° C. in the air.

By measuring the positive active material thus obtained for the particle size in the manner described in paragraph [0095], a value of the D50 particle diameter can be determined.

However, in the process of production of the battery and the process of charge-discharge of the battery, some positive active material particles may be broken. By making a SEM observation of a positive electrode plate taken out from the battery, an approximate ratio at which the positive active material is broken can be known. When it can be predicted that broken positive active material particles are included, the average particle size (D50 particle size) is determined after data is corrected so that particles of 2 μm or less are excluded in a particle size distribution curve obtained from measurement for excluding a fine powder generated due to breakage.

In the present invention, the discharge capacity may be significantly improved by including Na in an amount of 900 ppm or more and 16000 ppm or less or K in an amount of 1200 ppm or more and 18000 ppm or less in a positive active material for a lithium secondary battery which contains a lithium transition metal composite oxide represented by the composition formula of $Li_{1+\alpha}Me_{1-\alpha}O_2$ (Me is a transition metal including Co, Ni and Mn and $\alpha>0$) in view of Examples described above.

By using a positive active material containing a novel lithium transition metal composite oxide of the present invention, a lithium secondary battery having a high discharge capacity can be provided, and therefore the lithium secondary battery is useful for hybrid cars and electric cars.

What is claimed is:

1. A positive active material for a lithium secondary battery, comprising a lithium transition metal composite oxide having an α-$NaFeO_2$-type crystal structure and represented by the composition formula of $Li_{1+\alpha}Me_{1-\alpha}O_2$ (Me is a transition metal including Co, Ni and Mn and $\alpha>0$), wherein the positive active material contains Na in an amount of 900 ppm or more and 16000 ppm or less, or K in an amount of 1200 ppm or more and 18000 ppm or less, a pore size of the positive active material which shows a maximum differential pore volume is in a range of 30 to 40 nm, and the positive active material has a peak differential pore volume of 0.85 $mm^3$/(g·nm) or more.

2. The positive active material for a lithium secondary battery according to claim 1, wherein the positive active material has a 50% particle size (D50) of 8 to 10 μm in particle size distribution measurement.

3. The positive active material for a lithium secondary battery according to claim 1, wherein a molar ratio of Li to Me is represented by $(1+\alpha)/(1-\alpha)$ and is 1.25 to 1.45.

4. An electrode for a lithium secondary battery comprising the positive active material for a lithium secondary battery according to claim 1.

5. A lithium secondary battery comprising the electrode for a lithium secondary battery according to claim 4.

* * * * *